United States Patent
Zhou et al.

(10) Patent No.: US 11,699,922 B2
(45) Date of Patent: Jul. 11, 2023

(54) WIRELESS CHARGING METHOD, RECEIVER, TERMINAL DEVICE, AND CHARGER

(71) Applicant: Huawei Digital Power Technologies Co., Ltd., Shenzhen (CN)

(72) Inventors: Di Zhou, Dongguan (CN); Le Wang, Xi'an (CN); Hao Zhang, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/509,357

(22) Filed: Oct. 25, 2021

(65) Prior Publication Data

US 2022/0045552 A1     Feb. 10, 2022

Related U.S. Application Data

(63) Continuation of application No. PCT/CN2020/073867, filed on Jan. 22, 2020.

(30) Foreign Application Priority Data

Apr. 26, 2019   (CN) .................. 201910345234.2

(51) Int. Cl.
  *H02J 50/12*    (2016.01)
  *H02J 50/80*    (2016.01)
  *H02J 50/10*    (2016.01)

(52) U.S. Cl.
  CPC .............. *H02J 50/12* (2016.02); *H02J 50/10* (2016.02); *H02J 50/80* (2016.02)

(58) Field of Classification Search
  CPC ...................................................... H02J 50/12
  (Continued)

(56) References Cited

U.S. PATENT DOCUMENTS 7,581,119 B2 * 8/2009 Tupman ................. G06F 1/266
                                                  713/340
7,904,121 B2   3/2011 Umeda et al.
(Continued)

FOREIGN PATENT DOCUMENTS

CN    101789638 A    7/2010
CN    104184218 A    12/2014
(Continued)

*Primary Examiner* — Edward Tso
*Assistant Examiner* — Ahmed H Omar
(74) *Attorney, Agent, or Firm* — Huawei Technologies Co., Ltd.

(57) ABSTRACT

A wireless charging method, a receiver, a terminal device, and a charger are provided. A receiver (20) includes an oscillation circuit (210), a power processor (220), a sampling control module (230), and an auxiliary power supply module (240). In a ping phase, the oscillation circuit receives first energy sent by a transmitter (10), and the sampling control module collects a first voltage value output by the oscillation circuit based on the first energy, and when the first voltage value is less than a startup voltage value of the power processor, controls the auxiliary power supply module to supply power to the power processor, so that the power processor is started. In a power transfer phase, the power processor sends a power transfer instruction to the transmitter, so that the transmitter sends second energy based on the power transfer instruction, to provide electric energy for a load in the receiver.

19 Claims, 15 Drawing Sheets

---

S101 — An oscillation circuit receives first energy sent by a transmitter, where the first energy is pulse energy S102 — A sampling control module collects a first voltage value output by the oscillation circuit based on the first energy, and when the first voltage value is less than a startup voltage value of a power processor, controls an auxiliary power supply module to supply power to the power processor, so that the power processor is started S103 — The power processor sends a power transfer instruction to the transmitter, so that the transmitter sends second energy based on the power transfer instruction, where the second energy is not pulse energy, and the second energy is used to provide electric energy for a load in a receiver

(58) Field of Classification Search
USPC .......................................................... 320/108
See application file for complete search history.

(56) References Cited

U.S. PATENT DOCUMENTS

| | | | |
|---|---|---|---|
| 2010/0084918 | A1 | 4/2010 | Fells et al. |
| 2012/0293009 | A1 | 11/2012 | Kim et al. |
| 2018/0138749 | A1* | 5/2018 | Lee .................. H02J 50/12 |

FOREIGN PATENT DOCUMENTS

| | | | |
|---|---|---|---|
| CN | 105109358 | A * | 12/2015 |
| CN | 105109358 | A | 12/2015 |
| CN | 105895330 | A | 8/2016 |
| CN | 105990909 | A | 10/2016 |
| CN | 106208410 | A | 12/2016 |
| CN | 106300471 | A | 1/2017 |
| CN | 107658999 | A | 2/2018 |
| CN | 107945490 | A | 4/2018 |
| CN | 110165725 | A | 8/2019 |
| WO | 2013094464 | A1 | 6/2013 |
| WO | 2017082475 | A1 | 5/2017 |

* cited by examiner

WIRELESS CHARGING METHOD, RECEIVER, TERMINAL DEVICE, AND CHARGER

CROSS-REFERENCE TO RELATED APPLICATIONS

This application is a continuation of International Application No. PCT/CN2020/073867, filed on Jan. 22, 2020, which claims priority to Chinese Patent Application No. 201910345234.2, filed on Apr. 26, 2019. The disclosures of the aforementioned applications are hereby incorporated by reference in their entireties.

TECHNICAL FIELD

This application relates to the field of wireless charging technologies, and in particular, to a wireless charging method, a receiver, a terminal device, and a charger.

BACKGROUND

Wireless power transfer (WPT) is also referred to as a wireless charging technology, and is replacing old wired power transfer. A wireless charging transmitter may provide electric energy for a wireless charging receiver without depending on a charging cable. For example, when charging a mobile phone, the wireless charging transmitter directly charges the mobile phone wirelessly without connecting the charging cable. The wireless charging technology has many implementations. In the field of consumer electronic products, an electromagnetic induction wireless charging technology is widely used currently. The wireless power consortium (WPC) formulates, based on the electromagnetic induction wireless charging technology, the international wireless charging standard Qi that is compatible with all rechargeable electronic devices and is briefly referred to as the Qi standard.

In the Qi standard, interaction between a transmitter and a receiver includes three phases: a selection phase, a ping phase, and a power transfer phase. In the ping phase, the transmitter sends ping pulse energy to attempt to find out whether an object contains a receiver. When the ping pulse energy received by the receiver reaches a threshold of the receiver, the receiver establishes a power connection to the transmitter, that is, when the transmitter finds that the object contains a receiver, a connection is established in the ping phase. After the connection is established in the ping phase, a power transfer phase is entered. Space in which the receiver can be connected to the transmitter in the ping phase is referred to as a degree of freedom.

Because the Qi standard specifies an upper power limit of the ping pulse energy sent by the transmitter in the ping phase, to enable the receiver to be connected to the transmitter in the ping phase, the receiver is within a range in which the receiver can be connected to the transmitter in the ping phase, and has a low degree of freedom.

SUMMARY

Embodiments of this application provide a wireless charging method, a receiver, a terminal device, and a charger, to increase a charging degree of freedom of the receiver.

According to a first aspect, an embodiment of this application provides a receiver, where the receiver includes an oscillation circuit, a power processor, a sampling control module, and an auxiliary power supply module, where the oscillation circuit is configured to receive first energy sent by a transmitter, where the first energy is pulse energy; the sampling control module is configured to: collect a first voltage value output by the oscillation circuit based on the first energy, and when the first voltage value is less than a startup voltage value of the power processor, control the auxiliary power supply module to supply power to the power processor, so that the power processor is started; and the power processor is configured to send a power transfer instruction to the transmitter, so that the transmitter sends second energy based on the power transfer instruction, where the second energy is not pulse energy, and the second energy is used to provide electric energy for a load in the receiver.

According to the receiver in this application, the sampling control module and the auxiliary power supply module are disposed. Therefore, when the receiver is outside an original degree of freedom range of the transmitter, the sampling control module may control the auxiliary power supply module to supply power to the power processor, so that the receiver is connected to the transmitter in the ping phase to enter a subsequent power transfer phase. This increases a degree of freedom of a wireless charging system.

For example, an embodiment of the application further includes an operation of controlling the auxiliary power supply module to stop supplying power to the power processor, and the operation of controlling the auxiliary power supply module to stop supplying power to the power processor includes the following two manners:

In an embodiment, the oscillation circuit is further configured to receive the second energy sent by the transmitter; and the sampling control module is further configured to: collect a second voltage value output by the oscillation circuit based on the second energy, and when the second voltage value is greater than an output voltage of the auxiliary power supply module, control the auxiliary power supply module to stop supplying power to the power processor.

In an embodiment, the oscillation circuit is further configured to receive the second energy sent by the transmitter; and the power processor is further configured to: obtain a second voltage value output by the oscillation circuit based on the second energy, and when the second voltage value is greater than an output voltage of the auxiliary power supply module, control the auxiliary power supply module to stop supplying power to the power processor. In other words, in an embodiment, the power processor controls the auxiliary power supply module to be disabled, so that an entire control process thereof is simple and easy to implement.

In an embodiment, the sampling control module includes an application processor, and the application processor is separately connected to the oscillation circuit and the auxiliary power supply module.

In an embodiment, the sampling control module includes an application processor and a sampling unit; the sampling unit is separately connected to the oscillation circuit and the application processor, and is configured to: collect the first voltage value output by the oscillation circuit, compare the first voltage value with the startup voltage value of the power processor to obtain a first comparison result, and send the first comparison result to the application processor; and the application processor is connected to the auxiliary power supply module, and is configured to: when the first comparison result is that the first voltage value is less than the startup voltage value of the power processor, control the auxiliary power supply module to supply power to the power processor.

In an embodiment, the sampling unit is further configured to: collect the second voltage value output by the oscillation circuit, compare the second voltage value with the output voltage value of the auxiliary power supply module to obtain a second comparison result, and send the second comparison result to the application processor; and the application processor is further configured to: when the second comparison result is that the second voltage value is greater than the output voltage of the auxiliary power supply module, control the auxiliary power supply module to stop supplying power to the power processor.

The sampling control module in this application may include the AP. The AP is configured to: collect an output voltage value of the oscillation circuit, and control, based on the voltage value, the auxiliary power supply module to supply power to the power processor or to stop supplying power to the power processor. Therefore, an entire implementation process thereof is simple, a function of the AP is enriched, utilization of the AP is improved, and a volume of the receiver is not increased.

In an embodiment, the sampling unit includes a comparator and a reference voltage providing circuit, and the reference voltage providing circuit is configured to provide the output voltage value of the auxiliary power supply module and the startup voltage value of the power processor; a first input end of the comparator is connected to an output end of the oscillation circuit, and is configured to collect an output voltage of the oscillation circuit; a second input end of the comparator is connected to the reference voltage providing circuit, and is configured to obtain the output voltage value of the auxiliary power supply module or the startup voltage value of the power processor that is output by the reference voltage providing circuit; and an output end of the comparator is connected to the application processor, and is configured to output the first comparison result or the second comparison result to the application processor. In this way, the sampling unit includes, through setting, the comparator and the reference voltage providing circuit that respectively perform the foregoing functions, so that circuit implementation of the sampling unit is easy, costs are low, and a control policy is simple.

In an embodiment, the auxiliary power supply module includes a battery and a power supply control unit; a first end of the power supply control unit is connected to an output end of the battery, a second end of the power supply control unit is connected to the sampling control module, and a third end of the power supply control unit is connected to the power processor; and the power supply control unit is configured to output electric energy of the battery to the power processor under control of the sampling control module.

In an embodiment, the auxiliary power supply module further includes a backflow preventive unit, and the backflow preventive unit is connected between the third end of the power supply control unit and the power processor; and the backflow preventive unit is configured to: when the output voltage value of the oscillation circuit is greater than an output voltage value of the power supply control unit, prohibit electric energy output by the oscillation circuit from flowing back to the power supply control unit. In an embodiment, the backflow preventive unit includes a diode or a metal-oxide semiconductor field-effect (MOS) transistor.

In an embodiment, the power supply control unit includes a power management integrated circuit and a direct current converter; an input end of the power management integrated circuit is connected to the output end of the battery, an output end of the power management integrated circuit is connected to a first end of the direct current converter, a second end of the direct current converter is connected to an output end of the sampling control module, and a third end of the direct current converter is connected to the power processor; the sampling control module is configured to enable the direct current converter; and the power management integrated circuit is configured to output the electric energy of the battery to the power processor by using the enabled direct current converter.

In an embodiment, the power supply control unit includes a power management integrated circuit, a direct current converter, and a switch unit; an input end of the power management integrated circuit is connected to the output end of the battery, an output end of the power management integrated circuit is connected to an input end of the direct current converter, an output end of the direct current converter is connected to a first end of the switch unit, a second end of the switch unit is connected to an output end of the sampling control module, and a third end of the switch unit is connected to the power processor; the sampling control module is configured to control closing and opening of the switch unit; and the power management integrated circuit is configured to: when the switch unit is closed, output the electric energy of the battery to the power processor by using the direct current converter.

In an embodiment, the switch unit is a MOS transistor.

In an embodiment, the direct current converter is a direct current converter in the power management integrated circuit.

In an embodiment, the receiver in this application further includes a communications module; and the power processor is configured to send the power transfer instruction to the transmitter by using the communications module. In this way, reliable communication between the receiver and the transmitter can be implemented.

In an embodiment, the communications module includes a communications modulation module; and the power processor is configured to: generate the power transfer instruction by adjusting the communications modulation module, and send the power transfer instruction to the transmitter by using the communications module.

In an example, the communications modulation module includes at least one capacitor or at least one resistor; and the power processor is configured to: generate the power transfer instruction by adjusting a voltage value of the at least one capacitor or the at least one resistor, and send the power transfer instruction to the transmitter by using the communications module.

The communications modulation module in this application may include the following two structures to resolve the following problem: In a ping phase, when the receiver is outside the original degree of freedom range of the transmitter, an AC energy signal induced by the oscillation circuit in the receiver is very weak, and consequently a modulation depth of an in-band communication signal modulated by the receiver by using the communications modulation module is insufficient, and communication between the receiver and the transmitter fails.

In an embodiment, the communications modulation module includes a first communications modulation module and a second communications modulation module; and the power processor is configured to: when the auxiliary power supply module is enabled, generate a first power transfer instruction by using the first communications modulation module, and send the first power transfer instruction to the transmitter by using the communications module; or when the auxiliary power supply module is disabled, generate a second power transfer instruction by using the second communications modulation module, and send the second power transfer instruction to the transmitter by using the communications module.

In an embodiment, the communications modulation module includes a third communications modulation module with an adjustable parameter; and the power processor is configured to: when the auxiliary power supply module is enabled, generate a first power transfer instruction by adjusting the parameter of the third communications modulation module; or when the auxiliary power supply module is disabled, generate a second power transfer instruction by adjusting the parameter of the third communications modulation module.

In this application, the first communications modulation module and the second communications modulation module that are different from each other are disposed to respectively work when the auxiliary power supply module is enabled and when the auxiliary power supply module is disabled. Alternatively, the third communications modulation module with the adjustable parameter is disposed to separately switch the parameter when the auxiliary power supply module is enabled and when the auxiliary power supply module is disabled. Therefore, a reliable communication signal can be modulated when the power processor works due to power supply by the auxiliary power supply module.

According to a second aspect, an embodiment of this application provides a wireless charging method, where the method is applied to a receiver, the receiver includes an oscillation circuit, a power processor, a sampling control module, and an auxiliary power supply module, and the method includes: The oscillation circuit receives first energy sent by a transmitter, where the first energy is pulse energy. The sampling control module collects a first voltage value output by the oscillation circuit based on the first energy, and when the first voltage value is less than a startup voltage value of the power processor, controls the auxiliary power supply module to supply power to the power processor, so that the power processor is started. The power processor sends a power transfer instruction to the transmitter, so that the transmitter sends second energy based on the power transfer instruction, where the second energy is not pulse energy, and the second energy is used to provide electric energy for a load in the receiver.

In an embodiment, the method further includes: The oscillation circuit receives the second energy sent by the transmitter. The sampling control module collects a second voltage value output by the oscillation circuit based on the second energy, and when the second voltage value is greater than an output voltage of the auxiliary power supply module, controls the auxiliary power supply module to stop supplying power to the power processor.

In an embodiment, the method further includes: The oscillation circuit receives the second energy sent by the transmitter. The power processor obtains a second voltage value output by the oscillation circuit based on the second energy, and when the second voltage value is greater than an output voltage of the auxiliary power supply module, controls the auxiliary power supply module to stop supplying power to the power processor.

In an embodiment, the sampling control module includes an application processor.

In an embodiment, the sampling control module includes an application processor and a sampling unit. That the sampling control module collects a first voltage value output by the oscillation circuit based on the first energy, and when the first voltage value is less than a startup voltage value of the power processor, controls the auxiliary power supply module to supply power to the power processor includes: The sampling unit collects the first voltage value output by the oscillation circuit, compares the first voltage value with the startup voltage value of the power processor to obtain a first comparison result, and sends the first comparison result to the application processor. When the first comparison result is that the first voltage value is less than the startup voltage value of the power processor, the application processor controls the auxiliary power supply module to supply power to the power processor.

In an embodiment, that the sampling control module collects a second voltage value output by the oscillation circuit based on the second energy, and when the second voltage value is greater than an output voltage of the auxiliary power supply module, controls the auxiliary power supply module to be disabled includes: The sampling unit collects the second voltage value output by the oscillation circuit, compares the second voltage value with the output voltage value of the auxiliary power supply module to obtain a second comparison result, and sends the second comparison result to the application processor. When the second comparison result is that the second voltage value is greater than the output voltage of the auxiliary power supply module, the application processor controls the auxiliary power supply module to be disabled.

In an embodiment, the sampling unit includes a comparator and a first reference voltage providing circuit; the first reference voltage providing circuit is configured to provide the output voltage value of the auxiliary power supply module and the startup voltage value of the power processor; and the comparator is configured to: collect an output voltage of the oscillation circuit, obtain the output voltage value of the auxiliary power supply module or the startup voltage value of the power processor that is output by the reference voltage providing circuit, and output the first comparison result or the second comparison result to the application processor.

In an embodiment, the auxiliary power supply module includes a battery and a power supply control unit; and the power supply control unit is configured to output electric energy of the battery to the power processor under control of the sampling control module.

In an embodiment, the auxiliary power supply module further includes a backflow preventive unit. The backflow preventive unit is configured to: when the output voltage value of the oscillation circuit is greater than an output voltage value of the power supply control unit, prohibit electric energy output by the oscillation circuit from flowing back to the power supply control unit.

In an embodiment, the backflow preventive unit includes a diode or a MOS transistor.

In an embodiment, the power supply control unit includes a power management integrated circuit and a direct current converter; the sampling control module is configured to enable the direct current converter; and the power management integrated circuit is configured to output the electric energy of the battery to the power processor by using the enabled direct current converter.

In an embodiment, the power supply control unit includes a power management integrated circuit, a direct current converter, and a switch unit; the switch unit is configured to be closed and opened under control of the sampling control module; and the power management integrated circuit is configured to: when the switch unit is closed, output the electric energy of the battery to the power processor by using the direct current converter.

In an embodiment, the switch unit is a MOS transistor.

In an embodiment, the direct current converter is a direct current converter in the power management integrated circuit.

In an embodiment, the receiver further includes a communications module; and that the power processor sends a power transfer instruction to the transmitter includes: The power processor sends the power transfer instruction to the transmitter by using the communications module.

In an embodiment, the communications module includes a communications modulation module; and that the power processor sends the power transfer instruction to the transmitter by using the communications module includes: The power processor generates the power transfer instruction by adjusting the communications modulation module, and sends the power transfer instruction to the transmitter by using the communications module.

In an example, the communications modulation module includes at least one capacitor or at least one resistor; and that the power processor generates the power transfer instruction by adjusting the communications modulation module includes: The power processor generates the power transfer instruction by adjusting a voltage value of the at least one capacitor or the at least one resistor, and sends the power transfer instruction to the transmitter by using the communications module.

In an embodiment, the communications modulation module includes a first communications modulation module and a second communications modulation module; and that the power processor generates the power transfer instruction by adjusting the communications modulation module includes: When the auxiliary power supply module is enabled, the power processor generates a first power transfer instruction by using the first communications modulation module; or when the auxiliary power supply module is disabled, the power processor generates a second power transfer instruction by using the second communications modulation module.

In an embodiment, the communications modulation module includes a third communications modulation module with an adjustable parameter; and that the power processor generates the power transfer instruction by adjusting the communications modulation module includes: When the auxiliary power supply module is enabled, the power processor generates a first power transfer instruction by adjusting the parameter of the third communications modulation module; or when the auxiliary power supply module is disabled, the power processor generates a second power transfer instruction by adjusting the parameter of the third communications modulation module.

According to a third aspect, an embodiment of this application provides a terminal device, where the terminal device includes the receiver according to the first aspect, the terminal device may implement a function corresponding to each operation in the method in the second aspect, and the function may be implemented by hardware, or may be implemented by hardware by executing corresponding software. The hardware or the software includes one or more units or modules corresponding to the foregoing function.

In an embodiment, the terminal device includes a processor. The processor is configured to support the apparatus in performing a corresponding function in the method in the second aspect. The terminal device may further include a memory. The memory is configured to be coupled to the processor, and stores program instructions and data required by the apparatus. In an embodiment, the receiver in the terminal device is configured to support communication between the apparatus and another network element. The receiver may be an independent receiver or a receiver integrated with a sending/receiving function.

According to a fourth aspect, an embodiment of this application provides a terminal device, where the terminal device includes the receiver according to the first aspect.

According to a fifth aspect, an embodiment of this application provides a charger, including the receiver according to the first aspect.

According to a sixth aspect, an embodiment of this application provides a computer storage medium, where the storage medium includes computer instructions, and when the instructions are executed by a computer, the computer is enabled to implement the wireless charging method in any one of the possible implementations of the second aspect.

According to a seventh aspect, an embodiment of this application provides a computer program product, where the program product includes a computer program, the computer program is stored in a readable storage medium, and a terminal device or a charger may read the computer program from the readable storage medium, and execute the computer program, so that the terminal device or the charger implements the wireless charging method in any one of the possible implementations of the second aspect.

According to the wireless charging method, the receiver, the terminal device, and the charger that are provided in the embodiments of this application, the oscillation circuit, the power processor, the sampling control module, and the auxiliary power supply module are disposed. In the ping phase, the oscillation circuit is configured to receive the first energy sent by the transmitter, and the sampling control module collects the first voltage value output by the oscillation circuit based on the first energy, and when the first voltage value is less than the startup voltage value of the power processor, controls the auxiliary power supply module to supply power to the power processor, so that the power processor is started. Then, the power transfer phase is entered, and the power processor sends the power transfer instruction to the transmitter, so that the transmitter sends the second energy based on the power transfer instruction, to provide electric energy for the load in the receiver. According to the receiver, the sampling control module and the auxiliary power supply module are disposed. Therefore, when the receiver is outside the original degree of freedom range of the transmitter, the sampling control module may control the auxiliary power supply module to supply power to the power processor, so that the receiver is connected to the transmitter in the ping phase to enter the subsequent power transfer phase. This increases the degree of freedom of the wireless charging system.

DESCRIPTION OF EMBODIMENTS

To make one of ordinary skilled in the art understand technical solutions in this application better, the following describes embodiments of this application with reference to accompanying drawings in the embodiments of this application.

Figure 1:
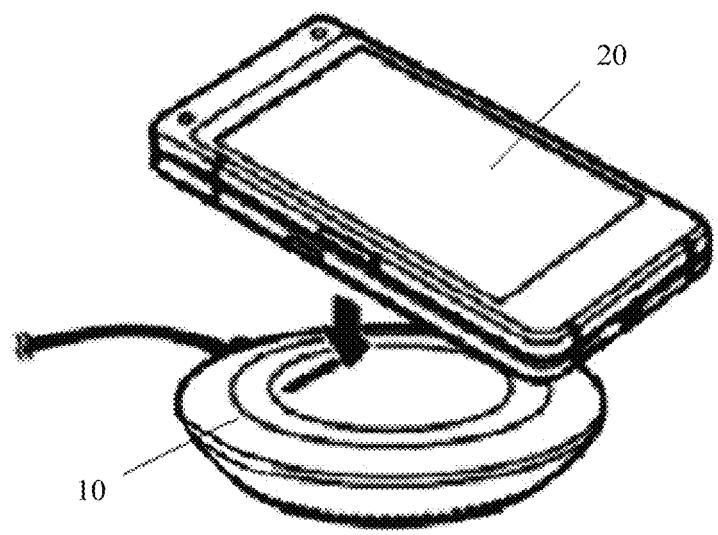
FIG. 1 is a schematic architectural diagram of a wireless charging system according to an embodiment of this application.

FIG. 1 is a schematic architectural diagram of a wireless charging system according to an embodiment of this application. As shown in FIG. 1, the wireless charging system includes a receiver 20 and a transmitter 10. The transmitter 10 is a device that can generate near-field inductive electric energy, and the receiver 20 is a device that can use the near-field inductive electric energy. The transmitter 10 may transmit electric energy to the receiver 20 to wirelessly charge the receiver 20.

The receiver 20 may be movable user equipment (UE), an access terminal, a subscriber unit, a subscriber station, a mobile station, a mobile site, a remote station, a remote terminal, a user terminal, or a user agent. The access terminal may be a cellular phone, a handheld device having a wireless communication function, a computing device or a vehicle-mounted device, a wearable device, a terminal in a 5G system, a terminal in a future evolved public land mobile network (PLMN), or the like. For example, the receiver 20 may be a mobile phone, a tablet computer (Pad), a computer with a wireless sending/receiving function, a virtual reality (VR) terminal device, an augmented reality (augmented reality, AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, and the like.

Alternatively, the receiver 20 may be a wireless charging electric vehicle, a smartphone, an e-book reader, a desktop personal computer (PC), a laptop PC, a netbook computer, a workstation, a server, a personal digital assistant (PDA), a portable multimedia player (PMP), an MP3 player, a mobile medical device, a camera, or a wearable device (for example, smart glasses, a head mounted device (HMD), an electronic apparel, an electronic bracelet, an electronic necklace, an electronic application accessory (or accessory), an electronic tattoo, a smart mirror, or a smart watch). Alternatively, the receiver 20 may be a smart home appliance. The smart home appliance may be, for example, a television (TV), a digital versatile disc (DVD) player, an audio player, a refrigerator, an air conditioner, a cleaner, an oven, a microwave oven, a washer, an air purifier, a set-top box, a home automation control panel, a security control panel, a television set-top box (for example, Samsung HomeSync™, Apple TV™, or Google TV™), a game console (for example, Xbox™ or Play Station™), an electronic dictionary, an electronic key, a video camera or a digital photo frame, various medical devices (for example, various portable medical instruments such as a glucose meter, a heart rate meter, a blood pressure meter, and a thermometer, a magnetic resonance angiography (MRA) machine, a magnetic resonance imaging (MRI) machine, a computed tomography (CT) machine, a medical video camera, and an ultrasonic apparatus), a navigation apparatus, a global positioning system (GPS) receiver, an event data recorder (EDR), a flight data recorder (FDR), an automotive infotainment device, a marine electronic device (for example, a marine navigation device or a gyrocompass), an aeronautical electronic device, a security device, a vehicle head unit, an industrial or home robot, an automatic teller machine (ATM) used in a bank, or a point of sale (POS) or internet of things (IoT) device (for example, an electronic bulb, various sensors, a meter or a gas meter, a water sprinkler, a fire alarm, a thermostat, a road lamp, a toaster, a fitness device, a hot water tank, a heater, or a boiler) used in a store; or may be a part of furniture or a building/structure, an electronic board, an electronic signature receiving device, a projector, or various instruments (for example, instruments used for water, electricity, or gas). In various embodiments, the receiver 20 may be one or a combination of the foregoing devices. The receiver in some embodiments may be a flexible electronic device. In addition, the receiver in an embodiment of the application is not limited to the foregoing devices, and may be a new receiver introduced with technical improvement.

Figure 2:
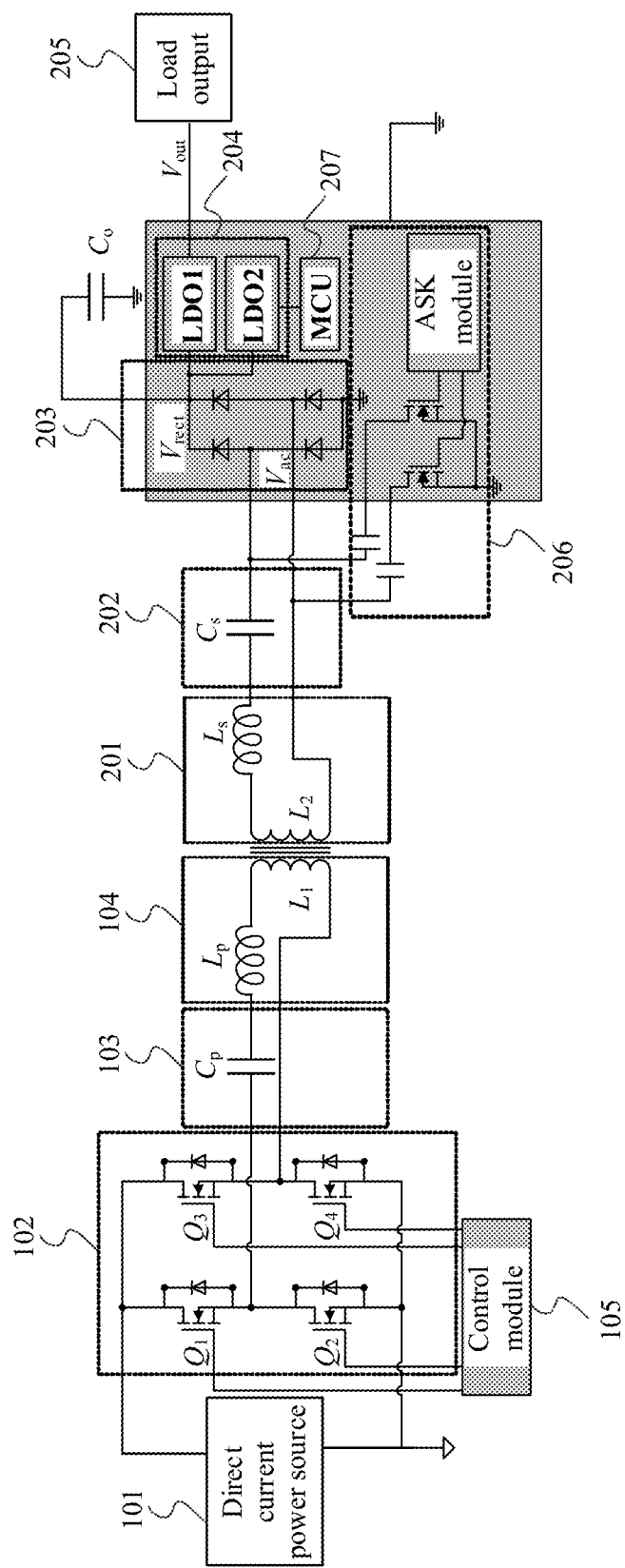
FIG. 2 is a schematic diagram of an equivalent circuit of a wireless charging system according to an embodiment of this application.

FIG. 2 is a schematic diagram of an equivalent circuit of a wireless charging system according to an embodiment of this application. The wireless charging system includes a receiver 20 and a transmitter 10.

It should be noted that FIG. 2 is a schematic diagram of a series-series (SS) compensation equivalent circuit of a loosely coupled transformer including the transmitter 10 and the receiver 20. The transmitter 10 and the receiver 20 may be alternatively implemented as a parallel-parallel (PP) compensation, series-parallel (SP) compensation, and parallel-series (PS) compensation equivalent circuit. A implementation is not limited herein. In this application, the SS compensation equivalent circuit is used as an example for description.

In addition to an electromagnetic induction wireless charging technology, the receiver 20 proposed in an embodiment of the application may be further applied to a magnetic resonance wireless charging technology, or may be further applied to a near field communication (NFC) wireless charging technology or a microwave wireless charging technology. A technology to which the receiver 20 is applied to is not limited herein. In this application, that the receiver 20 is applied to the electromagnetic induction wireless charging technology is used merely as an example for description.

The transmitter 10 may include a direct current power source 101, a rectifier module 102, a series matching capacitor (a capacitance value is Cp) 103, a transmit coil 104, and a control module 105.

In an embodiment, as shown in FIG. 2, the direct current power source 101 is configured to provide electric energy for charging. The rectifier module 102 is connected to the direct current power source 101, and is configured to: receive a direct current output by the direct current power source 101, and convert the received direct current into an alternating current for output. The series matching capacitor (the capacitance value is Cp) 103 is connected to the transmit coil 104 to form an oscillation circuit. The oscillation circuit is connected to the rectifier module 102, and is configured to: receive the alternating current output by the rectifier module 102, and provide the alternating current for the transmit coil 104. Power of the transmit coil 104 is transferred to a receive coil 201 through coupling between the transmit coil 104 and the receive coil 201. The control module 105 may be separately connected to the direct current power source 101, the rectifier module 102, the series matching capacitor (the capacitance value is Cp) 103, and the transmit coil 104, and is configured to exchange a control parameter with each module to control each module.

The rectifier module 102 may be a full-bridge inverter circuit, a half-bridge inverter circuit, or another inverter circuit that converts a direct current into an alternating current. This is not limited in an embodiment of the application.

The receiver 20 may include the receive coil 201, a series matching capacitor (a capacitance value is Cs) 202, a rectifier module 203, a voltage regulator module 204, a load output 205, a communications module 206, and a control module 207.

For example, as shown in FIG. 2, the receive coil 201 is connected to the series matching capacitor (the capacitance value is Cs) 202 to form an oscillation circuit on the receiver 20 side. The receive coil 201 receives, through coil coupling, the power transferred by the transmit coil 104, and converts the power into an alternating current by using the oscillation circuit. The rectifier module 203 is connected to the oscillation circuit, and is configured to: receive the alternating current output by the oscillation circuit, and rectify the alternating current to obtain a direct current output voltage Vrect. The voltage regulator module 204 is connected to the rectifier module 203, and is configured to: eliminate fluctuation of the output voltage Vrect of the rectifier module 203, and output a regulated voltage Vout. The load output 205 is connected to the voltage regulator module 204, and is configured to receive the power supply voltage Vout output by the voltage regulator module 204. The communications module 206 is configured to implement communication between the receiver 20 and the transmitter 10. There are a plurality of communication manners such as in-band communication (intraband transmission, In-Band), Bluetooth communication, ZigBee communication, and Wi-Fi communication. In an embodiment of the application, in-band communication is used as an example for description, and an actual communication manner is not limited.

Figure 3A:
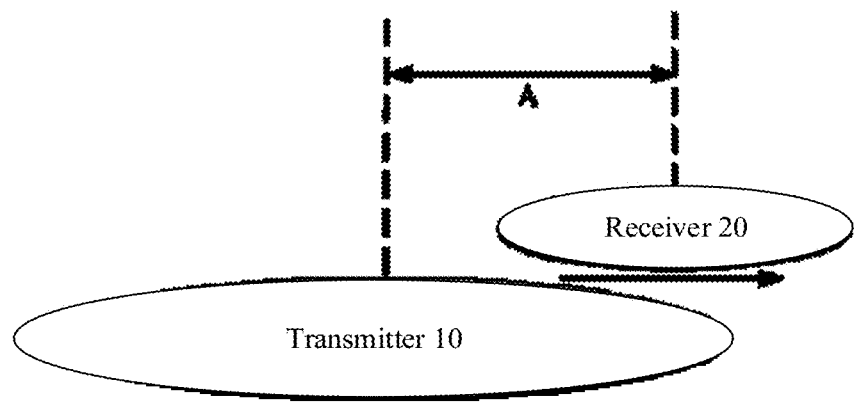
FIG. 3a is a schematic diagram of a degree of freedom according to an embodiment of this application.

In actual use, a degree of freedom in a wireless charging technology is one of key indicators that affect actual user experience. The following describes a concept of the degree of freedom. FIG. 3a is a schematic diagram of a degree of freedom according to an embodiment of this application, and FIG. 3b is another schematic diagram of a degree of freedom according to an embodiment of this application.

Figure 3B:
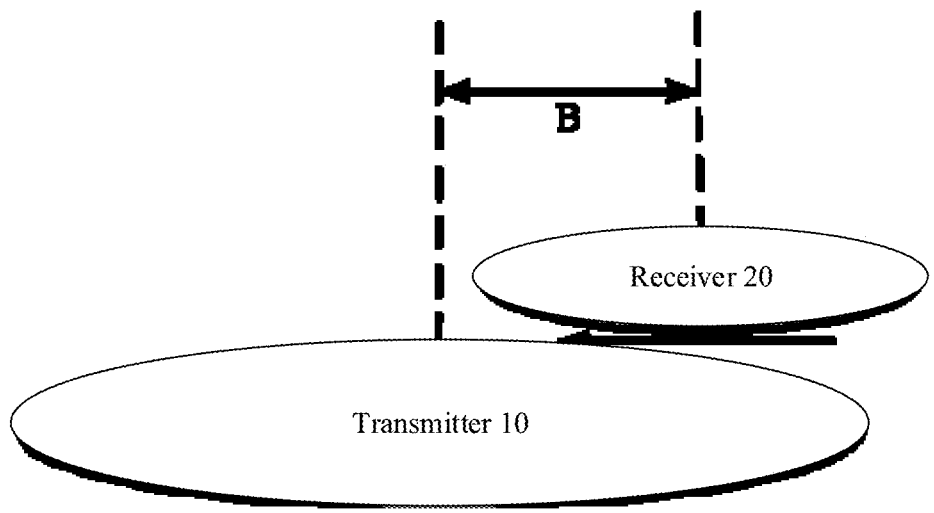
FIG. 3b is another schematic diagram of a degree of freedom according to an embodiment of this application.

FIG. 3a and FIG. 3b show space ranges in which charging can be performed when the receiver 20 is placed on a surface of the transmitter 10. As shown in FIG. 3a, after the receiver 20 has established a charging connection to the transmitter 10, the receiver 20 moves outwards from a center of the transmitter 10 to a boundary at which charging cannot be performed, and a space range within the boundary at which charging cannot be performed is denoted as A. It should be noted that A is a three-dimensional variable representing the space range, and A in FIG. 3a is a radius value of a cross-section of three-dimensional space. A condition for the boundary at which charging cannot be performed is as follows: Power sent by the transmitter 10 to the receiver 20 reaches an upper limit of power that can be output by the transmitter 10. In this case, a voltage Vrect output by the receiver 20 by receiving the output power meets a working voltage threshold of the control module 207 in the receiver 20. At this point, the power sent by the transmitter 10 has reached the upper limit of the power that can be transferred by the transmitter 10. Therefore, when the receiver 20 is further away from the transmitter 10, the voltage Vrect output by the receiver 20 by receiving the power transferred by the transmitter 10 is less than the working voltage threshold of the control module 207, the control module 207 cannot work normally, the charging connection established between the receiver 20 and the transmitter 10 is broken, and the receiver 20 cannot be charged. A working state of the receiver 20 at the boundary at which charging cannot be performed is referred to as a critical power-failure state.

As shown in FIG. 3b, after the receiver 20 does not establish a charging connection to the transmitter 10, the receiver 20 moves from outer space of the transmitter 10 to a center of the transmitter 10 to reach a boundary at which charging can be performed, and a space range within the boundary at which charging can be performed is denoted as B. It should be noted that B is a three-dimensional variable representing the space range, and B in FIG. 3b is a radius value of a cross-section of three-dimensional space. A condition for the boundary at which charging can be performed is as follows: When the receiver 20 does not establish a charging connection to the transmitter 10, energy sent by the transmitter 10 by using the transmit coil is pulse energy, and the pulse energy is referred to as ping pulse energy. Therefore, a phase from a moment at which the receiver 20 does not establish a charging connection to the transmitter 10 to a moment at which the receiver 20 establishes a charging connection to the transmitter 10 is referred to as a ping phase. As the receiver 20 approaches the center of the transmitter 10, a voltage Vrect output by the receiver 20 by receiving the ping pulse energy is gradually increased. When the receiver 20 moves to the boundary at which charging can be performed, Vrect reaches a working voltage threshold of the control module 207. The control module 207 works normally, and sends a power transfer instruction to the transmitter 10 by using the communications module 206. The transmitter 10 stops sending the ping pulse energy based on the power transfer instruction, and sends non-pulse electric energy instead. A state in which the working voltage threshold of the control module 207 is reached is referred to as a state in which the receiver 20 can be connected in the ping phase. At this position, the receiver 20 establishes a normal charging connection to the transmitter 10, and the receiver 20 may be normally charged.

The receiver 20 may be charged within both A and B. In a current wireless charging system, a range of A is greater than a range of B according to the Qi standard specified in WPC, and therefore the range of B is defined as the degree of freedom.

To facilitate understanding of the embodiments of this application, the following first describes some concepts or terms in the embodiments of this application.

(1) Coupling Coefficient

The coupling coefficient is used to represent a degree of coupling between the transmit coil in the transmitter 10 and the receive coil 101 in the receiver 20. A higher coupling coefficient indicates higher efficiency with which the transmit coil 104 in the transmitter 10 transfers power to the receive coil 101 in the receiver 20. The coupling coefficient is related to an offset distance between the two devices (the transmitter 10 and the receiver 20). A larger offset distance between the transmitter 10 and the receiver 20 indicates a smaller degree of coupling between the transmit coil 104 in the transmitter 10 and the receive coil 101 in the receiver 20 and a smaller coupling coefficient. Therefore, during wireless charging, a smaller offset distance between the transmitter 10 and the receiver 20 indicates higher charging efficiency of the wireless charging system. In other words, the coupling coefficient is determined based on the offset distance between the transmitter 10 and the receiver 20. The offset distance herein is an offset distance between the transmit coil 104 in the transmitter 10 and the receive coil 101 in the receiver 20. For understanding of the offset distance, refer to FIG. 3a and FIG. 3b. A and B each are also a type of offset distance. Details are not described herein again.

(2) Inductor

A physical quantity symbol of the inductor is L, and a value of the inductor is referred to as inductance. An alternating current resistance (alternating current resistance, ACR) and reactive power of a coil limit an unlimited increase of the inductance. A reason is as follows: 1. The inductance is directly proportional to a square of a quantity of turns of the coil. The quantity of turns needs to be increased to increase the inductance in same stacking space. After the quantity of turns is increased, a wire diameter of a winding is definitely decreased, the ACR is increased, a coil loss is increased, and efficiency is decreased. 2. Power consumed when the coil generates a magnetic field and a capacitor is charged/discharged is referred to as the reactive power. The reactive power depends on matching between the coil inductor and the capacitor in a resonant circuit. Therefore, to minimize the reactive power, the inductance needs be controlled within a specified range and cannot be increased unlimitedly.

Because an upper power limit of ping pulse energy sent by the transmitter 10 is specified in the Qi standard, the receiver 20 is limited by an application environment. For example, when the receiver 20 is a smart watch, due to limitation of a size of the smart watch, a size of the receive coil 101 in the receiver 20 cannot be very large, and consequently the coupling coefficient between the receiver 20 and the transmitter 10 is relatively low. When the receiver 20 is wirelessly charged, the receive coil 101 is limited by the reactive power, and the quantity of turns and a coil size cannot be very large. Due to the foregoing plurality of factors, only when the receiver 20 is relatively close to the transmitter 10, the receiver 20 can be connected in the ping phase to establish a charging connection to the transmitter 10. This causes a relatively low degree of freedom, and affects user experience of using the receiver.

To resolve the foregoing technical problem, based on the schematic diagram of the receiver 10 in the wireless charging system in FIG. 2, this application provides a wireless charging method and a receiver. The following describes the receiver 10 provided in the embodiments of this application.

Figure 4:
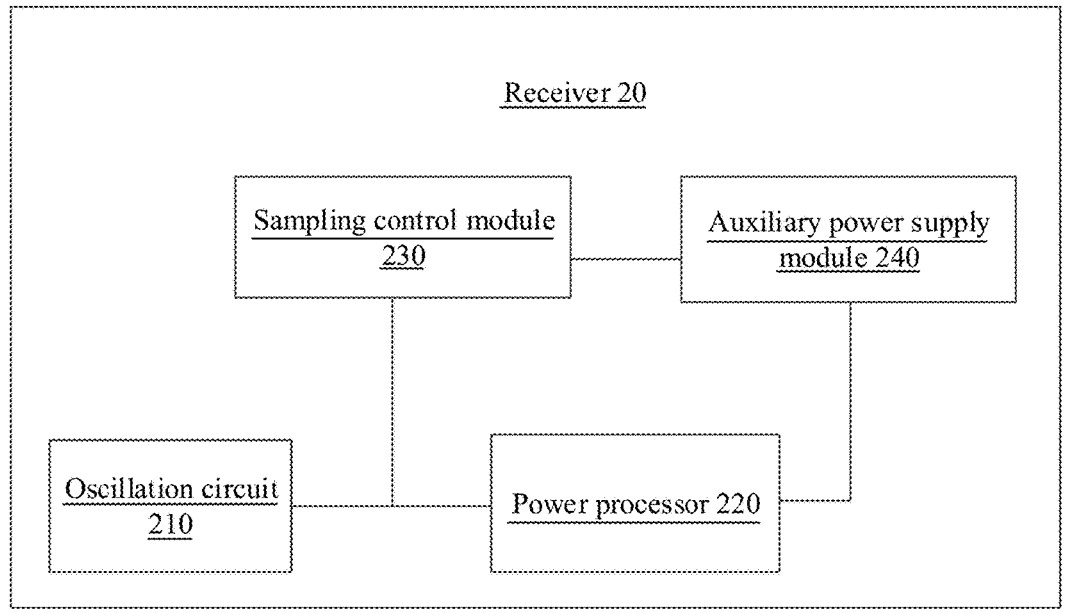
FIG. 4 is a schematic diagram of a receiver according to an embodiment of this application.

FIG. 4 is a schematic diagram of a receiver according to an embodiment of this application. As shown in FIG. 4, a receiver 20 in an embodiment of the application includes an oscillation circuit 210, a power processor 220, a sampling control module 230, and an auxiliary power supply module 240. The oscillation circuit 210 is separately connected to the power processor 220 and the sampling control module 230, and the auxiliary power supply module 240 is separately connected to the sampling control module 230 and the power processor 220. Compared with the receiver 20 shown in FIG. 2, the sampling control module 230 and the auxiliary power supply module 240 are mainly added to the receiver 20 in an embodiment of the application. The sampling control module 230 is configured to collect an output voltage of the oscillation circuit 210. In addition, the sampling control module 230 is further configured to: when determining that the output voltage of the oscillation circuit 210 is less than a startup voltage of the power processor 220, control the auxiliary power supply module 240 to supply power to the power processor 220.

A working process is as follows: In a ping phase, as shown in FIG. 3b, if the receiver 20 is outside an original degree of freedom range of a transmitter, in other words, if a distance between the receiver 20 and a center of the transmitter is greater than B, the oscillation circuit 210 may induce first energy sent by the transmitter, where the first energy is ping pulse energy, and output a first voltage value based on the first energy. However, because the first voltage value is less than a working voltage value of the power processor 220, the power processor 220 cannot be started. In this case, the sampling control module 230 in an embodiment of the application collects the first voltage value output by the oscillation circuit 210, and compares the first voltage value with the startup voltage value of the power processor 220. When the sampling control module 230 determines that the first voltage value is less than the startup voltage value of the power processor 220, the sampling control module 230 sends a control signal to the auxiliary power supply module 240 to control the auxiliary power supply module 240 to supply power to the power processor 220, so that the power processor 220 is started. Therefore, the receiver 20 is connected to the transmitter in the ping phase to enter a subsequent power transfer phase. In other words, in an embodiment of the application, when the receiver 20 is outside the original degree of freedom range of the transmitter, power is supplied to the power processor 220 in an auxiliary power supply manner, so that the receiver 20 is connected to the transmitter in the ping phase to enter the subsequent power transfer phase. This increases a degree of freedom of a wireless charging system.

In the power transfer phase, after being started, the power processor 220 sends a power transfer instruction to the transmitter. The power transfer instruction is used to instruct the transmitter to send second energy, the second energy is used to provide electric energy for a load in the receiver 20, and the second energy is continuous electric energy. The transmitter stops sending the ping pulse energy based on the power transfer instruction, and sends the continuous energy instead, in other words, sends the second energy. The receiver 20 receives the second energy sent by the transmitter, and supplies power to the load by using the second energy. A process of the power transfer phase in an embodiment of the application is the same as that of the power transfer phase of the existing wireless charging system shown in FIG. 2. Details are not described herein again.

It may be learned from the foregoing descriptions that, in an embodiment of the application, the receiver 20 can be connected to the transmitter in the ping phase to perform subsequent power transfer, provided that a position relationship between the receiver 20 and the transmitter meets the following condition: The oscillation circuit 210 may receive the first energy sent by the transmitter. Compared with a manner in which the receiver 20 shown in FIG. 3b needs to be within the degree of freedom range B of the transmitter, a charging distance between the receiver 20 and the transmitter is increased, and a degree of freedom for wireless charging is increased, so that user experience in wireless charging is improved.

In an embodiment, the oscillation circuit 210 in FIG. 4 may include the receive coil, the inductor Ls, and the series matching capacitor Cs that are shown in FIG. 2. The power processor 220 in FIG. 4 is equivalent to the control module in FIG. 2.

According to the receiver 20 in an embodiment of the application, the oscillation circuit 210, the power processor 220, the sampling control module 230, and the auxiliary power supply module 240 are disposed. In the ping phase, the oscillation circuit 210 is configured to receive the first energy sent by the transmitter, and the sampling control module 230 collects the first voltage value output by the oscillation circuit 210 based on the first energy, and when the first voltage value is less than the startup voltage value of the power processor 220, controls the auxiliary power supply module 240 to supply power to the power processor 220, so that the power processor 220 is started. Then, the power transfer phase is entered, and the power processor 220 sends the power transfer instruction to the transmitter, so that the transmitter sends the second energy based on the power transfer instruction, to provide electric energy for the load in the receiver 20. According to the receiver 20, the sampling control module 230 and the auxiliary power supply module 240 are disposed. Therefore, when the receiver 20 is outside the original degree of freedom range of the transmitter, the sampling control module 230 may control the auxiliary power supply module 240 to supply power to the power processor 220, so that the receiver 20 is connected to the transmitter in the ping phase to enter the subsequent power transfer phase. This increases the degree of freedom of the wireless charging system.

It may be learned from the foregoing embodiment that the power processor 220 is started due to power supply by the auxiliary power supply module 240, and sends the power transfer instruction to the transmitter, so that the transmitter sends the second energy based on the power transfer instruction. In the power transfer phase, a process in which the receiver 20 adjusts the second energy sent by the transmitter is a closed-loop feedback adjustment process. A process is as follows: The receiver 20 compares an expected voltage value with a second voltage value currently received by the receiver 20, and sends a voltage difference between the expected voltage value and the actually received second voltage value to the transmitter. The transmitter adjusts transmit power based on the voltage difference. With the foregoing closed-loop feedback adjustment process, after adjustment is completed, when the second voltage value actually received by the receiver 20 is equal to the expected voltage value, the wireless charging system enters a smooth charging phase.

It may be learned from the foregoing descriptions that, in the power transfer phase, the transmitter gradually increases output power, and a voltage received by the receiver 20 from the transmitter is also gradually increased. To avoid a waste, of electric energy of the auxiliary power supply module 240, caused because the auxiliary power supply module 240 continuously supplies power to the power processor 220 in a subsequent wireless charging process, when electric energy received by the receiver 20 from the transmitter is greater than an output voltage value of the auxiliary power supply module 240, or when electric energy received by the receiver 20 from the transmitter reaches the expected voltage value of the receiver 20, the auxiliary power supply module 240 is controlled to stop supplying power to the power processor 220, and power is supplied to the power processor 220 by using the electric energy received by the receiver 20 from the transmitter.

It should be noted that the output voltage value of the auxiliary power supply module 240 is greater than or equal to the startup voltage of the power processor 220, and the output voltage value of the auxiliary power supply module 240 is less than the expected voltage value of the receiver 20.

The following provides the following different implementations to control the auxiliary power supply module 240 to stop supplying power to the power processor 220.

In an embodiment, the power processor 220 controls the auxiliary power supply module 240 to stop supplying power to the power processor 220. In an embodiment, because the power processor 220 is connected to an output end of the oscillation circuit 210, the power processor 220 may collect the second voltage value output by the oscillation circuit 210. In addition, because the auxiliary power supply module 240 supplies power to the power processor 220, the power processor 220 may obtain the output voltage value of the auxiliary power supply module 240. Then, the power processor 220 compares the second voltage value with the output voltage of the auxiliary power supply module 240. When the second voltage value is greater than the output voltage of the auxiliary power supply module 240, the power processor 220 controls the auxiliary power supply module 240 to be disconnected from the power processor 220, and power is supplied to the power processor 220 by using the second voltage output by the oscillation circuit 210. In other words, in an embodiment, the power processor 220 controls the auxiliary power supply module 240 to be disabled, so that an entire control process thereof is simple and easy to implement.

In an embodiment, the sampling control module 230 controls the auxiliary power supply module 240 to stop supplying power to the power processor 220. In an embodiment, because the sampling control module 230 is connected to the auxiliary power supply module 240, the sampling control module 230 obtains the output voltage value of the auxiliary power supply module 240. The sampling control module 230 collects, in real time, the second voltage value output by the oscillation circuit 210. Then, the sampling control module 230 compares the second voltage value with the output voltage of the auxiliary power supply module 240. When the second voltage value is greater than the output voltage of the auxiliary power supply module 240, the sampling control module 230 controls the auxiliary power supply module 240 to be disconnected from the power processor 220. In this case, power is supplied to the power processor 220 by using the second voltage output by the oscillation circuit 210.

On the basis of the foregoing embodiment in FIG. 4, the sampling control module 230 in an embodiment of the application may have different structures. The following describes in detail a working principle of the receiver 20 with reference to the sampling control module 230 having different structures.

In an embodiment, the sampling control module 230 may be an application processor (application processor, AP). The AP may be an existing AP in the receiver 20. The AP may collect the output voltage value of the oscillation circuit 210, and control, based on the voltage value, the auxiliary power supply module 240 to be connected to or disconnected from the power processor 220. In an embodiment, in the ping phase, the AP is configured to: collect the first voltage value output by the oscillation circuit 210, and when the first voltage value is less than the startup voltage of the power processor 220, control the auxiliary power supply module 240 to supply power to the power processor 220. In the power transfer phase, the AP is configured to: collect the second voltage value output by the oscillation circuit 210, and when the second voltage value is greater than the output voltage of the auxiliary power supply module 240, control the auxiliary power supply module 240 to stop supplying power to the power processor 220. In an embodiment, a new function is assigned to the existing AP in the receiver 20, so that the AP implements a function of the sampling control module 230. This enriches a function of the AP and improves utilization of the AP.

In an embodiment, the AP includes an input/output interface (I/O) interface and an analog to digital converter (ADC) interface. The output end of the oscillation circuit 210 is connected to the I/O interface or the ADC interface of the AP. The I/O interface or the ADC interface of the AP collects the output voltage value of the oscillation circuit 210. A processing chip inside the AP completes voltage comparison, and controls the auxiliary power supply module 240 based on a comparison result. For example, in the ping phase, the I/O interface or the ADC interface of the AP collects the first voltage value output by the oscillation circuit 210, and sends the first voltage value to the processing chip inside the AP. The processing chip stores the startup voltage value of the power processor 220. When the first voltage value is less than the startup voltage value of the power processor 220, the processing chip sends power supply control information to the auxiliary power supply module 240, for example, sends high level information to the auxiliary power supply module 240. In this way, when receiving a high level signal sent by the AP, the auxiliary power supply module 240 supplies power to the power processor 220. In the power sending phase, the I/O interface or the ADC interface of the AP collects the second voltage value output by the oscillation circuit 210, and sends the second voltage value to the processing chip inside the AP. The processing chip stores the output voltage value of the auxiliary power supply module 240. When the second voltage value is greater than the output voltage value of the auxiliary power supply module 240, the processing chip sends disabling control information to the auxiliary power supply module 240, for example, sends a low level signal to the auxiliary power supply module 240. In this way, when receiving the low level signal sent by the AP, the auxiliary power supply module 240 stops supplying power to the power processor 220. In an embodiment, the AP may send a low level signal to the auxiliary power supply module 240, so that when receiving the low level signal sent by the AP, the auxiliary power supply module 240 supplies power to the power processor 220. Alternatively, the AP sends a high level signal to the auxiliary power supply module 240, so that when receiving the high level signal sent by the AP, the auxiliary power supply module 240 stops supplying power to the power processor 220.

Figure 5:
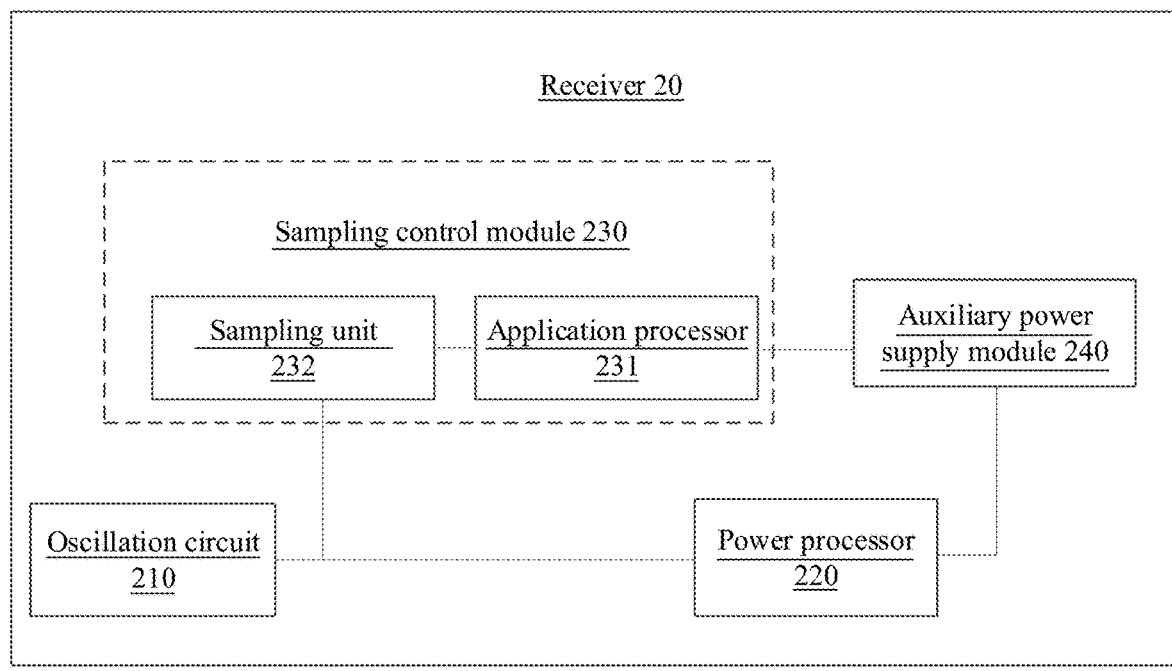
FIG. 5 is a schematic diagram of a structure of a controller according to an embodiment of this application.

In an embodiment, FIG. 5 is a schematic diagram of a structure of a controller according to an embodiment of this application. The sampling control module 230 may include an application processor 231 and a sampling unit 232. The sampling unit 232 is separately connected to the oscillation circuit 210 and the application processor 231, and the application processor 231 is connected to the auxiliary power supply module 240.

A implementation process is as follows: In the ping phase, the sampling unit 232 is configured to: collect the first voltage value output by the oscillation circuit 210, and compare the first voltage value with the startup voltage value of the power processor 220 to obtain a first comparison result. Then, the sampling unit 232 sends the first comparison result to the application processor 231. When the first comparison result is that the first voltage value is less than the startup voltage value of the power processor 220, the application processor 231 is configured to control the auxiliary power supply module 240 to supply power to the power processor 220.

In the power transfer phase, the sampling unit 232 is configured to: collect the second voltage value output by the oscillation circuit 210, and compare the second voltage value with the output voltage value of the auxiliary power supply module 240 to obtain a second comparison result. Then, the sampling unit 232 sends the second comparison result to the application processor 231. When the second comparison result is that the second voltage value is greater than the output voltage of the auxiliary power supply module 240, the application processor 231 is configured to control the auxiliary power supply module 240 to stop supplying power to the power processor 220, so that the receiver 20 supplies power to the power processor 220 by using the electric energy received from the transmitter.

In an embodiment, the sampling unit 232 may store the startup voltage value of the power processor 220 and the output voltage value of the auxiliary power supply module 240. When collecting the first voltage value, the sampling unit 232 compares the first voltage value with the startup voltage value that is of the power processor 220 and that is stored in the sampling unit 232, to generate the first comparison result. When collecting the second voltage value, the sampling unit 232 compares the second voltage value with the output voltage value of the auxiliary power supply module 240 to generate the second comparison result.

It may be learned from the foregoing descriptions that the sampling control module in an embodiment of the application may include the AP. The AP is configured to: collect an output voltage value of the oscillation circuit, and control, based on the voltage value, the auxiliary power supply module to supply power to the power processor or to stop supplying power to the power processor. Therefore, an entire implementation process thereof is simple, a function of the AP is enriched, utilization of the AP is improved, and a volume of the receiver is not increased.

Figure 6:
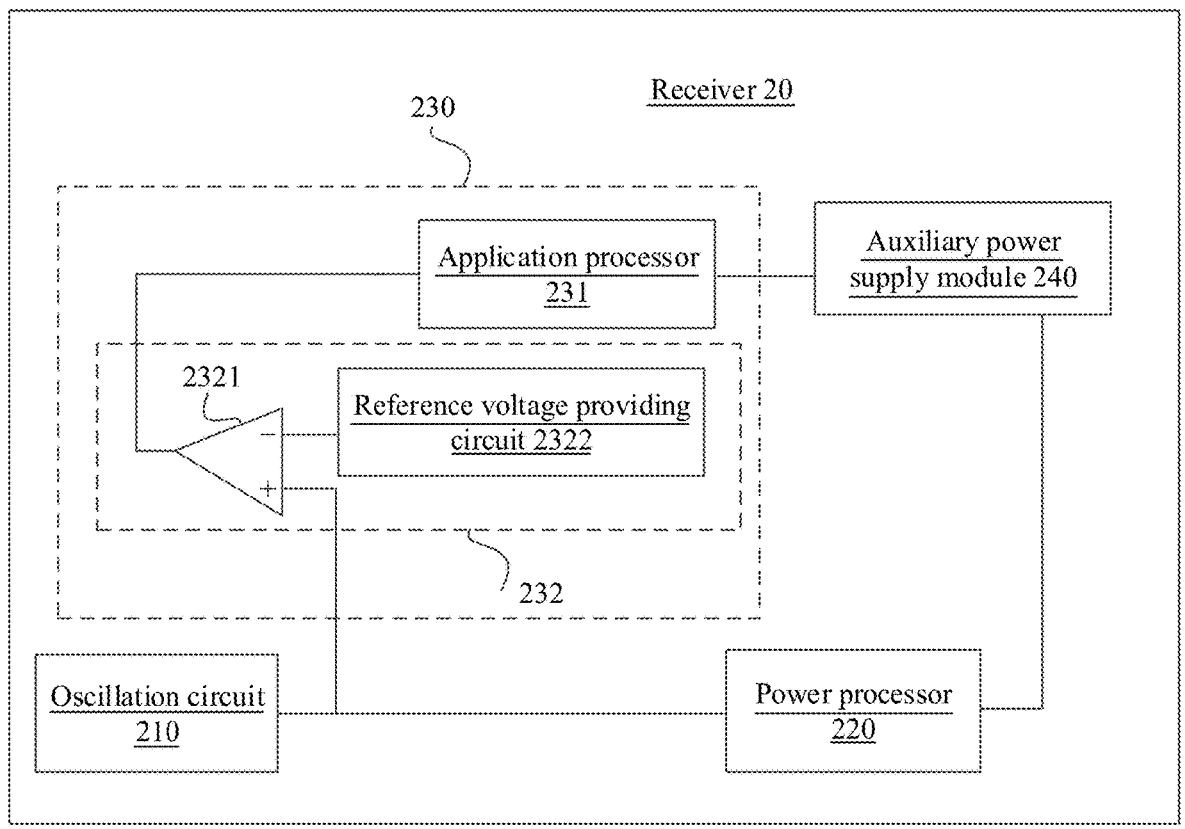
FIG. 6 is a schematic diagram of a structure of a sampling unit shown in FIG. 5.

In an example, on the basis of FIG. 5, FIG. 6 is a schematic diagram of a structure of a sampling unit shown in FIG. 5. The sampling unit 232 includes a comparator 2321 and a reference voltage providing circuit 2322. The reference voltage providing circuit 2322 may provide a plurality of voltage values based on an actual requirement. As shown in FIG. 6, the comparator 2321 has two input ends and one output end. A first input end of the comparator 2321 is a positive (+) input end of the comparator 2321, and is connected to the output end of the oscillation circuit 210. A second input end of the comparator 2321 is a negative (−) input end of the comparator 2321, and is connected to the reference voltage providing circuit 2322. The output end of the comparator 2321 is connected to the application processor 231.

To ensure that wireless charging can be effectively performed in the wireless charging system, the position relationship between the receiver 20 and the transmitter needs to meet a preset condition. The preset condition is as follows: In the ping phase, the receiver 20 may receive the first energy sent by the transmitter, that is, the first voltage value output by the oscillation circuit 210 in the receiver 20 based on the first electric energy is greater than 0 V. The comparator 2321 can determine a magnitude of the collected first voltage value only through voltage comparison. Therefore, the reference voltage providing circuit 2322 in an embodiment of the application may provide a preset reference voltage value Vref. The reference voltage value Vref is greater than 0 V and is less than the startup voltage value of the power processor 220. The comparator 2321 may compare the collected first voltage value with the reference voltage value Vref to determine whether the position relationship between the receiver 20 and the transmitter meets the preset condition. After the position relationship between the receiver 20 and the transmitter meets the preset condition, the receiver 20 executes the wireless charging process provided in an embodiment of the application.

In an example, in addition to the reference voltage value Vref, the reference voltage providing circuit 2322 may further provide the output voltage value of the auxiliary power supply module 240 and the startup voltage value of the power processor 220. For example, the reference voltage providing circuit 2322 includes three different voltage providing circuits and one controller. The three different voltage providing circuits are respectively configured to provide the reference voltage value Vref, the output voltage value of the auxiliary power supply module 240, and the startup voltage value of the power processor 220. The controller may control which voltage providing circuit in the three voltage providing circuits accesses the second input end of the comparator 2321. For example, the reference voltage providing circuit 2322 includes one voltage power supply circuit, and the voltage power supply circuit may provide the foregoing three voltages.

A implementation process is as follows: In the ping phase, the reference voltage providing circuit 2322 first outputs the reference voltage Vref to the second input end of the comparator 2321. The first input end of the comparator 2321 collects the first voltage value output by the oscillation circuit 210. A comparator circuit in the comparator 2321 compares the first voltage value with the reference voltage Vref. When the first voltage value is greater than the reference voltage Vref, it indicates that wireless charging can be performed between the receiver 20 and the transmitter. In this case, the reference voltage providing circuit 2322 outputs the startup voltage value of the power processor 220 to the second input end of the comparator 2321. The comparator circuit in the comparator 2321 compares the first voltage value with the startup voltage value of the power processor 220 to generate the first comparison result, and sends the first comparison result to the AP. The first comparison result is a high/low level signal. For example, when the first voltage value is less than the startup voltage value of the power processor 220, the first comparison result is a high level signal; or when the first voltage value is greater than or equal to the startup voltage value of the power processor 220, the first comparison result is a low level signal. In an embodiment, alternatively, when the first voltage value is less than the startup voltage value of the power processor 220, the first comparison result is a low level signal; or when the first voltage value is greater than or equal to the startup voltage value of the power processor 220, the first comparison result is a high level signal. When the first comparison result is that the first voltage value is less than the startup voltage value of the power processor 220, the AP controls the auxiliary power supply module 240 to supply power to the power processor 220. For example, when determining that the auxiliary power supply module 240 does not supply power to the power processor 220 and receiving the high level signal sent by the comparator 2321, the AP controls the auxiliary power supply module 240 to supply power to the power processor 220.

In the power transfer phase, the reference voltage providing circuit 2322 outputs the output voltage value of the auxiliary power supply module 240 to the second input end of the comparator 2321. The comparator circuit in the comparator 2321 compares the second voltage value with the output voltage value of the auxiliary power supply module 240 to generate the second comparison result, and sends the second comparison result to the AP. The second comparison result is also a high/low level signal. For example, when the second voltage value is greater than or equal to the output voltage value of the auxiliary power supply module 240, the second comparison result is a high level signal; or when the second voltage value is less than the output voltage value of the auxiliary power supply module 240, the second comparison result is a low level signal. In an embodiment, alternatively, when the second voltage value is greater than or equal to the output voltage value of the auxiliary power supply module 240, the second comparison result is a low level signal; or when the second voltage value is less than the output voltage value of the auxiliary power supply module 240, the second comparison result is a high level signal. When the second comparison result is that the second voltage value is greater than or equal to the output voltage value of the auxiliary power supply module 240, the AP controls the auxiliary power supply module 240 to stop supplying power to the power processor 220. For example, when determining that the auxiliary power supply module 240 is supplying power to the power processor 220 and receiving the high level signal sent by the comparator 2321, the AP controls the auxiliary power supply module 240 to stop supplying power to the power processor 220.

In an embodiment, the reference voltage providing circuit 2322 is connected to the auxiliary power supply module 240, and the auxiliary power supply module 240 provides electric energy for the reference voltage providing circuit 2322.

It may be learned from the foregoing descriptions that the sampling control module in an embodiment of the application includes the application processor and the sampling unit. The sampling unit is configured to collect the output voltage value of the oscillation circuit, and the application processor is configured to control, based on a voltage value collected by the sampling unit, the auxiliary power supply module to supply power to the power processor or to stop supplying power to the power processor. Therefore, circuit implementation of the sampling control module is easy, costs are low, and a control policy is simple.

On the basis of FIG. 4 to FIG. 6, FIG. 7 is a schematic diagram of a structure of a receiver according to an embodiment of this application. The following describes in detail the auxiliary power supply module 240 in the receiver 20 with reference to FIG. 7.

Figure 7:
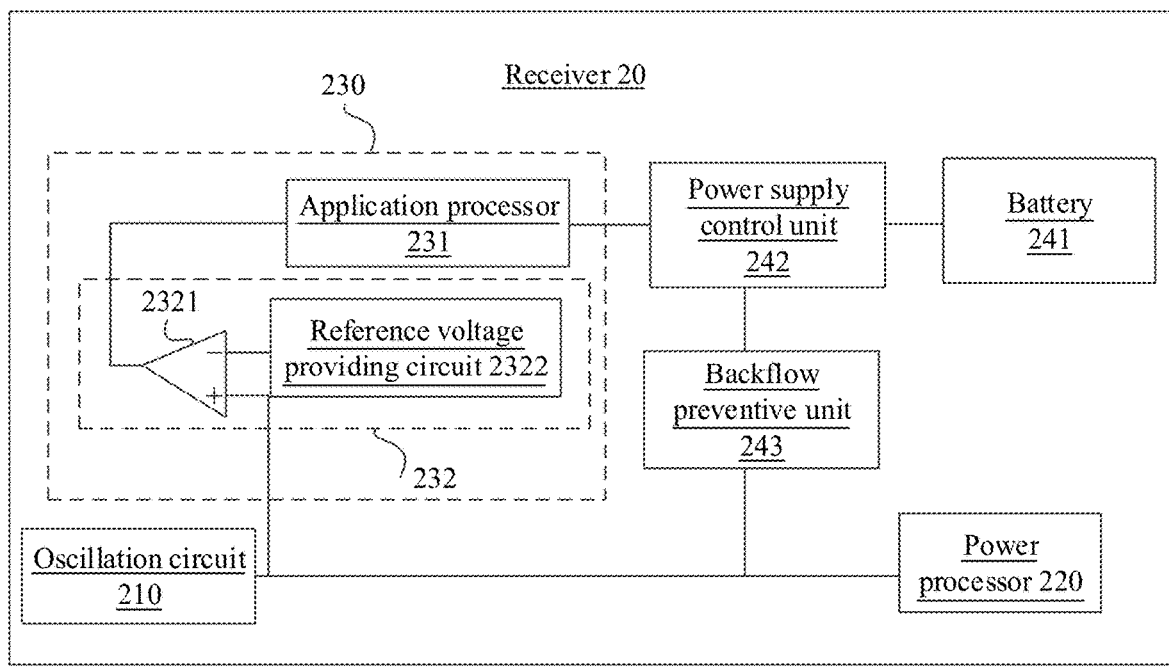
FIG. 7 is a schematic diagram of a structure of a receiver according to an embodiment of this application.

As shown in FIG. 7, the auxiliary power supply module 240 in an embodiment of the application includes a battery 241 and a power supply control unit 242. The power supply control unit 242 includes three ports. A first end of the power supply control unit 242 is connected to an output end of the battery 241, a second end of the power supply control unit 242 is connected to the sampling control module 230, and a third end of the power supply control unit 242 is connected to the processor. The power supply control unit 242 is configured to output electric energy of the battery 241 to the power processor 220 under control of the sampling control module 230.

A implementation process is as follows: In the ping phase, the sampling control module 230 collects the first voltage value output by the oscillation circuit 210. When determining that the first voltage value is less than the startup voltage value of the power processor 220, the sampling control module 230 sends, to the second end of the power supply control unit 242, a control signal indicating to supply power to the power processor 220. After receiving the control signal, the power supply control unit 242 outputs the electric energy of the battery 241 to the power processor 220 to supply power to the power processor 220.

In the power transfer phase, the power processor 220 or the sampling control module 230 sends, to the power supply control unit 242, a control signal indicating to stop supplying power to the power processor 220. After the power supply control unit 242 receives the control signal, the power supply control unit 242 controls the battery 241 to stop supplying power to the power processor 220. For example, the power supply control unit 242 is disconnected from the power processor 220, so that the battery 241 is disconnected from the power processor 220. Alternatively, the power supply control unit 242 is disconnected from the battery 241, so that the battery 241 is also disconnected from the power processor 220.

Still referring to FIG. 7, to prevent a high voltage output by the oscillation circuit 210 from flowing back to the power supply control unit 242 to damage the power supply control unit 242, a backflow preventive unit 243 is disposed between the third end of the power supply control unit 242 and the power processor 220. The backflow preventive unit 243 may allow electric energy output by the third end of the power supply control unit 242 to pass, and prevent electric energy output by the oscillation circuit 210 from passing. In other words, the backflow preventive unit 243 has a unilateral conduction function. In this way, when the output voltage value of the oscillation circuit 210 is greater than an output voltage value of the power supply control unit 242, the electric energy output by the oscillation circuit 210 may be prohibited from flowing back to the power supply control unit 242 to burn out a component of the power supply control unit 242. This protects the power supply control unit 242.

In an embodiment, the power supply control unit 242 may be a diode or a metal-oxide semiconductor field-effect (MOS) transistor.

In an embodiment, the battery 241 may be a battery that is in the receiver 20 and that supplies power to each load. For example, if the receiver 20 is a mobile phone, the battery 241 is a battery in the mobile phone.

In an embodiment, the battery 241 is a battery other than a battery that is in the receiver 20 and that supplies power to each load. When the battery that is in the receiver 20 and that supplies power to each load has no power, the battery 241 has power and may provide electric energy for the power processor 220. Therefore, wireless charging in an embodiment of the application can still be performed when the receiver 20 is powered off.

Figure 8:
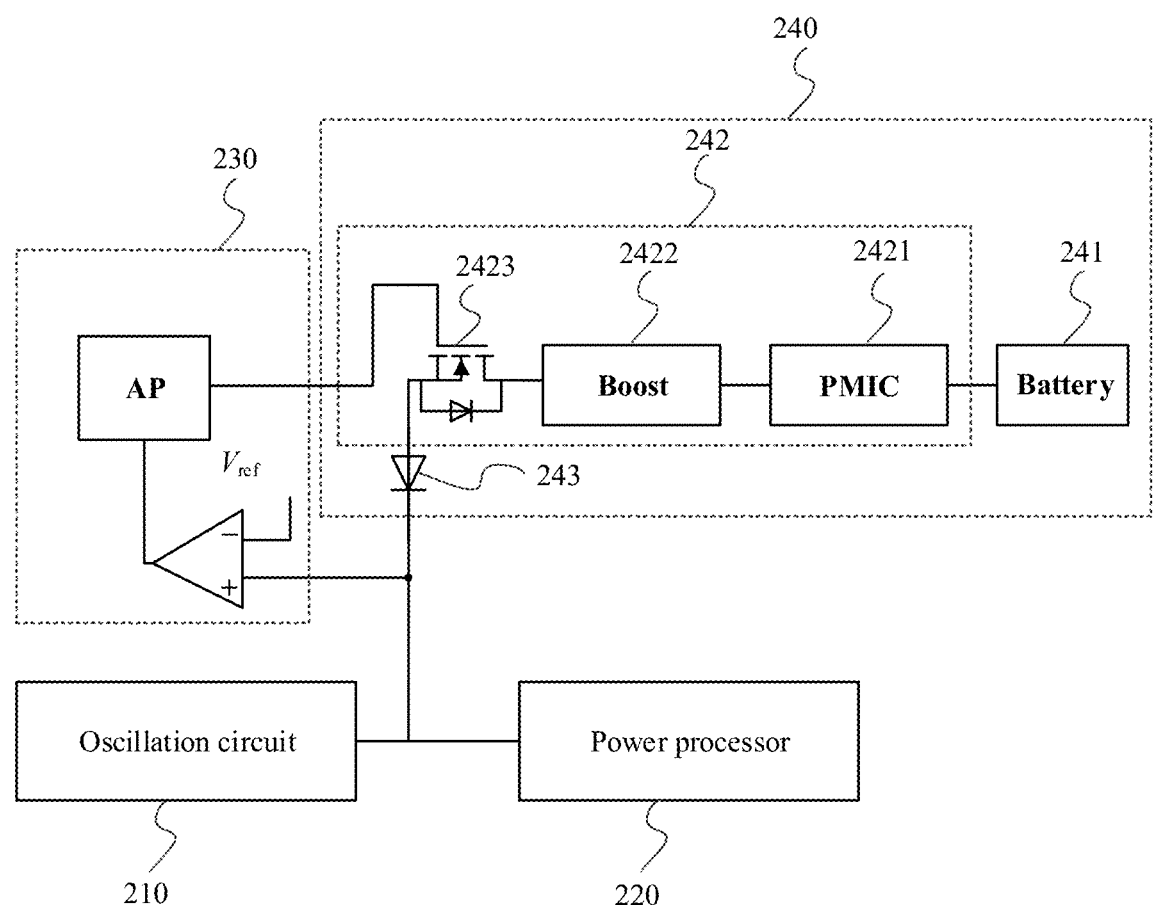
FIG. 8 is a schematic circuit diagram of a receiver according to an embodiment of this application.
Figure 9:
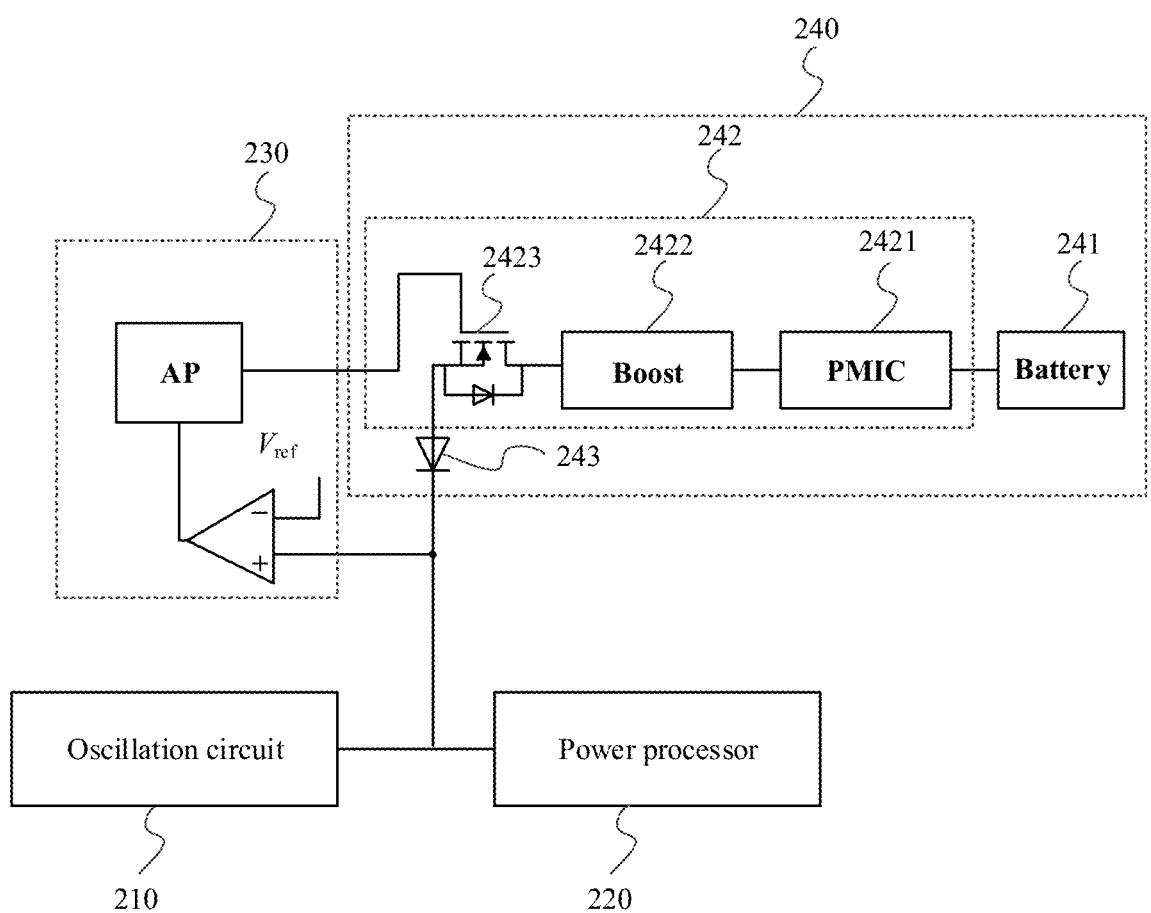
FIG. 9 is another schematic circuit diagram of a receiver according to an embodiment of this application.

On the basis of FIG. 7, FIG. 8 is a schematic circuit diagram of a receiver according to an embodiment of this application, and FIG. 9 is another schematic circuit diagram of a receiver according to an embodiment of this application. The power supply control unit 242 in the foregoing embodiment includes but is not limited to the structures shown in FIG. 8 and FIG. 9.

In an example of the power supply control unit 242, as shown in FIG. 8, the power supply control unit 242 may include a power management integrated circuit (PMIC) 2421 and a direct current converter 2422. An input end of the power management integrated circuit 2421 is connected to the output end of the battery 241. An output end of the power management integrated circuit 2421 is connected to a first end of the direct current converter 2422. A second end of the direct current converter 2422 is connected to an output end of the sampling control module 230. A third end of the direct current converter 2422 is connected to the processor. The sampling control module 230 is configured to enable the direct current converter 2422. The power management integrated circuit 2421 is configured to output the electric energy of the battery 241 to the power processor 220 by using the enabled direct current converter 2422.

A implementation process is as follows: In the ping phase, the sampling control module 230 collects the first voltage value output by the oscillation circuit 210. When determining that the first voltage value is less than the startup voltage value of the power processor 220, the sampling control module 230 enables the direct current converter 2422. After the direct current converter 2422 works, the power management integrated circuit 2421 outputs the electric energy of the battery 241 to the power processor 220 by using the direct current converter 2422, to supply power to the power processor 220.

In the power transfer phase, when the second voltage value output by the oscillation circuit 210 is greater than an output voltage of the direct current converter 2422, the power processor 220 or the sampling control module 230 controls the direct current converter 2422 to stop working, in other words, disables the direct current converter 2422. In this case, the power management integrated circuit 2421 cannot provide the energy of the battery 241 for the power processor 220 by using the disabled direct current converter 2422, so that the battery 241 stops supplying power to the power processor 220.

In another example of the power supply control unit 242, as shown in FIG. 9, the power supply control unit 242 includes a power management integrated circuit 2421, a direct current converter 2422, and a switch unit 2423. An input end of the power management integrated circuit 2421 is connected to the output end of the battery 241. An output end of the power management integrated circuit 2421 is connected to an input end of the direct current converter 2422. An output end of the direct current converter 2422 is connected to a first end of the switch unit 2423. A second end of the switch unit 2423 is connected to an output end of the sampling control module 230. A third end of the switch unit 2423 is connected to the processor. The sampling control module 230 is configured to control closing and opening of the switch unit 2423. The power management integrated circuit 2421 is configured to: when the switch unit 2423 is closed, output the electric energy of the battery 241 to the power processor 220 by using the direct current converter 2422.

A implementation process is as follows: In the ping phase, the sampling control module 230 collects the first voltage value output by the oscillation circuit 210. When determining that the first voltage value is less than the startup voltage value of the power processor 220, the sampling control module 230 controls the switch unit 2423 to be closed. In this case, the battery 241, the power management integrated circuit 2421, the direct current converter 2422, and the power processor 220 constitute a channel. The power management integrated circuit 2421 may output the electric energy of the battery 241 to the power processor 220 by using the direct current converter 2422, to supply power to the power processor 220.

In the power transfer phase, when the second voltage value output by the oscillation circuit 210 is greater than an output voltage of the direct current converter 2422, the power processor 220 or the sampling control module 230 controls the switch unit 2423 to be opened. In this case, the battery 241 is disconnected from the power processor 220, so that the battery 241 stops supplying power to the power processor 220.

In an embodiment, as shown in FIG. 9, the switch unit 2423 is a metal-oxide semiconductor field-effect (MOS) transistor. A gate of the MOS transistor is connected to the sampling control module 230, a drain of the MOS transistor is connected to the output end of the direct current converter 2422, and a source of the MOS transistor is connected to the power processor 220 by using the backflow preventive unit 243.

In an embodiment, the direct current converter 2422 shown in FIG. 8 and FIG. 9 may be a boost converter. The boost converter is a non-isolated power electronic converter, namely, a direct current-direct current (DC-DC) converter, and has a voltage step-up function. For example, the boost converter may step up a direct voltage output by the battery 241, and then output a voltage to the power processor 220.

In an embodiment, the power management integrated circuit 2421 includes a plurality of direct current converters. The direct current converter 2422 shown in FIG. 8 and FIG. 9 may be a direct current converter in the power management integrated circuit 2421.

On the basis of FIG. 4 to FIG. 9, FIG. 10 is a schematic diagram of a structure of a receiver according to an embodiment of this application. The receiver 20 in an embodiment of the application may further include a communications module 250. The power processor 220 sends the power transfer instruction to the transmitter by using the communications module 250.

The communications module 250 may be a wireless communications module 250, for example, an in-band communications module, a Bluetooth communications module, a ZigBee communications module, or a Wi-Fi communications module.

Figure 11:
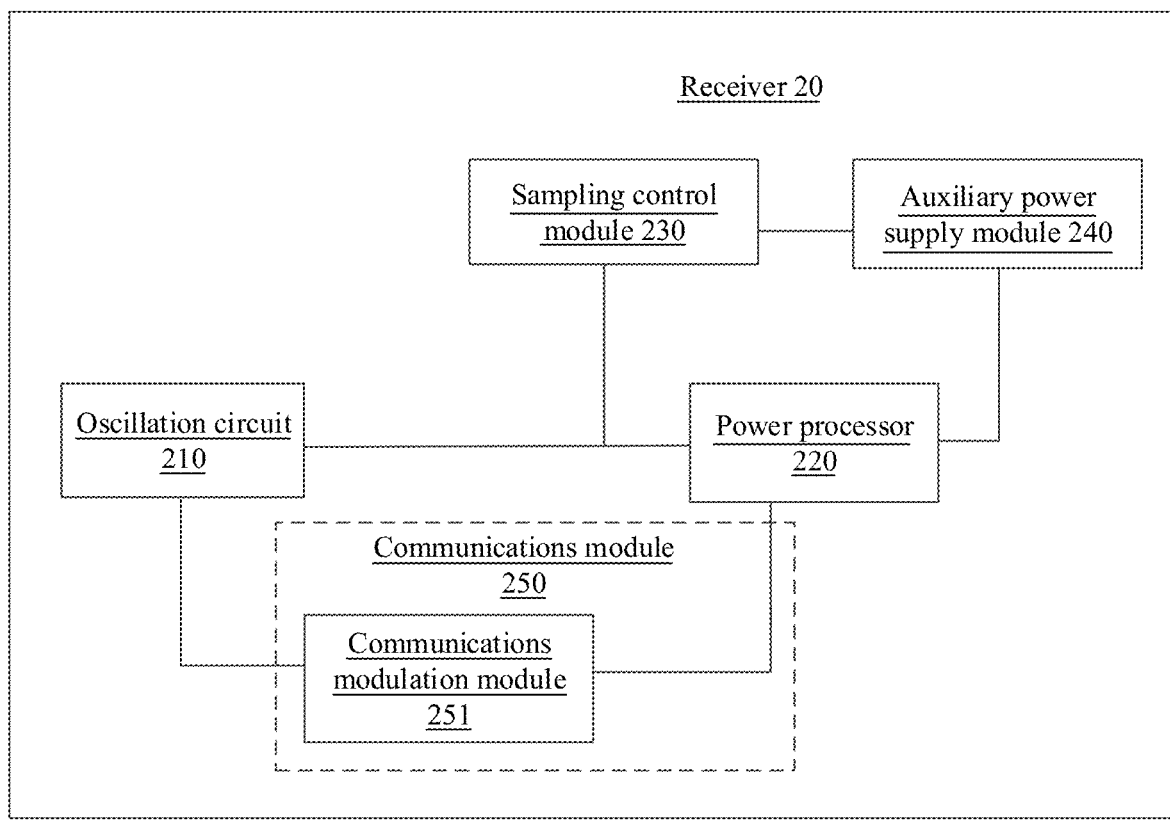
FIG. 11 is another schematic diagram of a structure of a receiver according to an embodiment of this application.

In some embodiments, referring to FIG. 11, the communications module 250 further includes a communications modulation module 251. The communications modulation module 251 is connected to the power processor 220. In an actual application, the power processor 220 adjusts the communications modulation module 251, so that the communications modulation module 251 generates a power transfer instruction; and sends the power transfer instruction to the transmitter by using the communications module 250.

Figure 12:
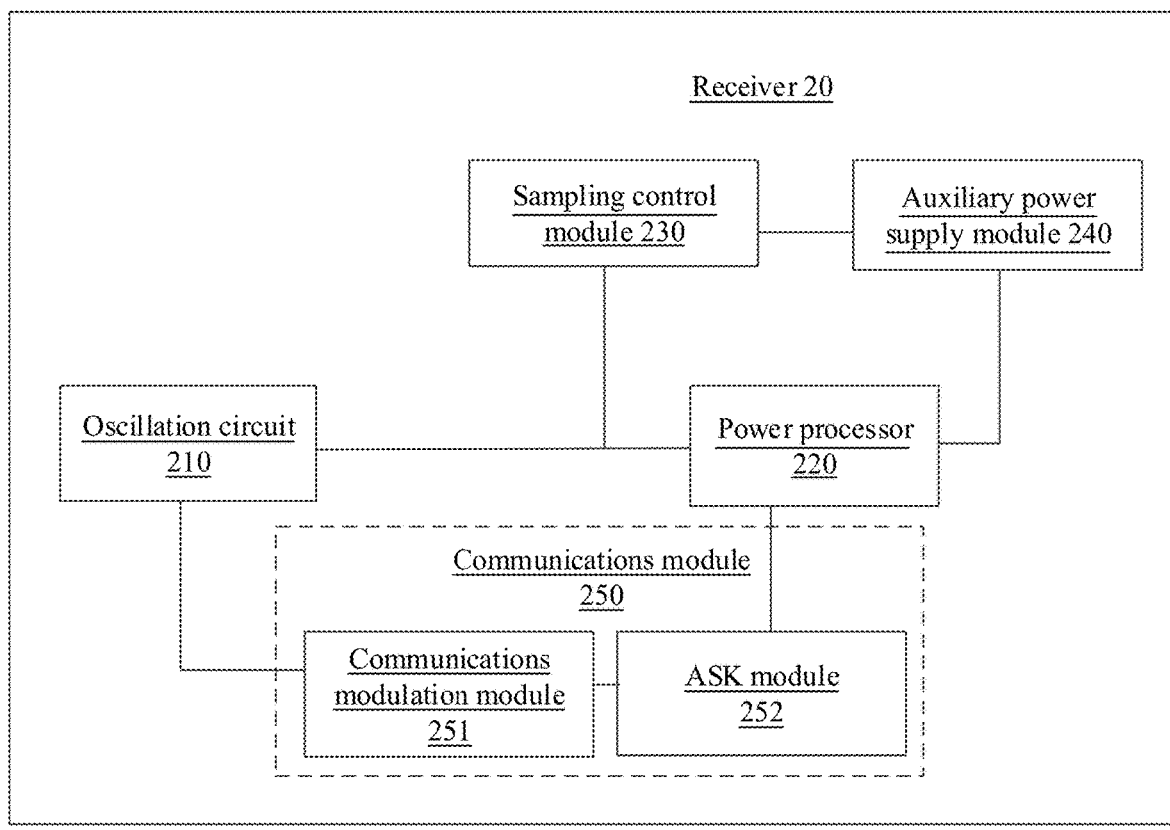
FIG. 12 is still another schematic diagram of a structure of a receiver according to an embodiment of this application.

In some embodiments, referring to FIG. 12, the communications module 250 further includes an ASK module 252. The ASK module 252 is separately connected to the power processor 220 and the communications modulation module 251. The ASK module 252 adjusts the communications modulation module 251 under control of the power processor 220, so that the communications modulation module 251 generates a power transfer instruction; and sends the power transfer instruction to the transmitter by using the communications module 250.

In an embodiment, the communications modulation module 251 shown in FIG. 11 and FIG. 12 may include at least one capacitor or at least one resistor. A process in which the communications modulation module 251 generates the foregoing power transfer instruction may be as follows: The power processor 220 generates the power transfer instruction by adjusting a voltage value of the at least one capacitor or the at least one resistor, and sends the power transfer instruction to the transmitter by using the communications module 250.

For example, FIG. 12 is used as an example for description. The power processor 220 delivers the power transfer instruction to the ASK module 252 in the communications module 250. The ASK module 252 in the communications module 250 may adjust the communications modulation module 251 to implement in-band communication between the receiver 20 and the transmitter. A manner of adjusting the communications modulation module 251 includes: switched capacitor modulation and/or switched resistor modulation. The communications module 250 modulates the power transfer instruction from the processor by using the ASK module 252, and adjusts connection and disconnection of a related capacitor and/or resistor in the communications modulation module 251 based on the power transfer instruction, so that the capacitor and/or the resistor in the communications modulation module 251 access/accesses a circuit of the receiver 20 or do/does not access a circuit of the receiver 20. Therefore, this changes a current or a voltage in the receive coil in the receiver 20, and changes a voltage or a current of the transmitter. The transmitter collects a voltage or a current and performs analysis after demodulation processing, to obtain the power transfer instruction sent by the receiver 20.

In an actual application, the following problem exists: In the ping phase, when the receiver 20 is outside the original degree of freedom range of the transmitter, an AC energy signal induced by the oscillation circuit 210 in the receiver 20 is very weak, and consequently a modulation depth of an in-band communication signal modulated by the receiver 20 by using the communications modulation module 251 is insufficient, and communication between the receiver 20 and the transmitter fails. To resolve the technical problem, an embodiment of the application proposes the following communications modulation module 251.

In an embodiment, the communications modulation module 251 includes a first communications modulation module and a second communications modulation module. The first communications modulation module works when the auxiliary power supply module 240 is enabled, and the second communications modulation module works when the auxiliary power supply module 240 is disabled. A working process is as follows: When the auxiliary power supply module 240 is enabled, the power processor 220 generates a first power transfer instruction by using the first communications modulation module, and sends the first power transfer instruction to the transmitter by using the communications module 250. When the auxiliary power supply module 240 is disabled, the power processor 220 generates a second power transfer instruction by using the second communications modulation module 1, and sends the second power transfer instruction to the transmitter by using the communications module 250.

In an embodiment, the communications modulation module 251 includes a third communications modulation module with an adjustable parameter. A working process thereof is as follows: When the auxiliary power supply module 240 is enabled, the power processor 220 adjusts the parameter of the third communications modulation module, for example, the third communications modulation module includes a capacitor and/or a resistor, and the third communications modulation module is modulated by adjusting a capacitance value and/or a resistance value, to generate a first power transfer instruction. When the auxiliary power supply module 240 is disabled, the power processor 220 generates a second power transfer instruction by adjusting the parameter of the third communications modulation module.

It may be learned from the foregoing descriptions that, in an embodiment of the application, the first communications modulation module and the second communications modulation module that are different from each other are disposed to respectively work when the auxiliary power supply module 240 is enabled and when the auxiliary power supply module 240 is disabled. Alternatively, the third communications modulation module with the adjustable parameter is disposed to separately switch the parameter when the auxiliary power supply module 240 is enabled and when the auxiliary power supply module 240 is disabled. Therefore, a reliable communication signal can be modulated when the power processor 220 works due to power supply by the auxiliary power supply module 240.

On the basis of FIG. 4 to FIG. 12, FIG. 13 is a circuit diagram of a receiver according to an embodiment of this application. The receiver 20 in an embodiment of the application further includes a rectifier module 260 and a buck module 270. The rectifier module 260 is separately connected to the oscillation circuit 210 and the buck module 270, and the buck module 270 is connected to the load in the receiver 20.

The rectifier module 260 is configured to: receive an alternating current output by the oscillation circuit 210, change a voltage of the alternating current to obtain a direct current output voltage Vrect, rectify the output voltage Vrect to eliminate fluctuation of the output voltage, and output a regulated output voltage Vrect. The buck module 270 is configured to perform step-down processing on the regulated output voltage Vrect output by the rectifier module 260, to output a voltage Vout required by a power consumption load connected to the buck module 270.

The rectifier module 260 includes an uncontrolled rectifier module 260 or a synchronous rectifier module 260. The uncontrolled rectifier module 260 includes at least one diode. The synchronous rectifier module 260 includes at least one metal-oxide semiconductor field-effect transistor (MOSFET). When a module included in the rectifier module 260 is an uncontrolled rectifier module, the oscillation circuit 210 in the receiver 20 is referred to as a diode full-bridge rectifier circuit. When a module included in the rectifier module 260 is a synchronous rectifier module, the oscillation circuit 210 in the receiver 20 is referred to as a switching transistor synchronous rectifier circuit. When the rectifier module 260 is another module, the oscillation circuit 210 in the receiver 20 may be a half-bridge rectifier circuit, or may be another rectifier circuit converting an alternating current into a direct current. This is not limited in an embodiment of the application.

Figure 13:
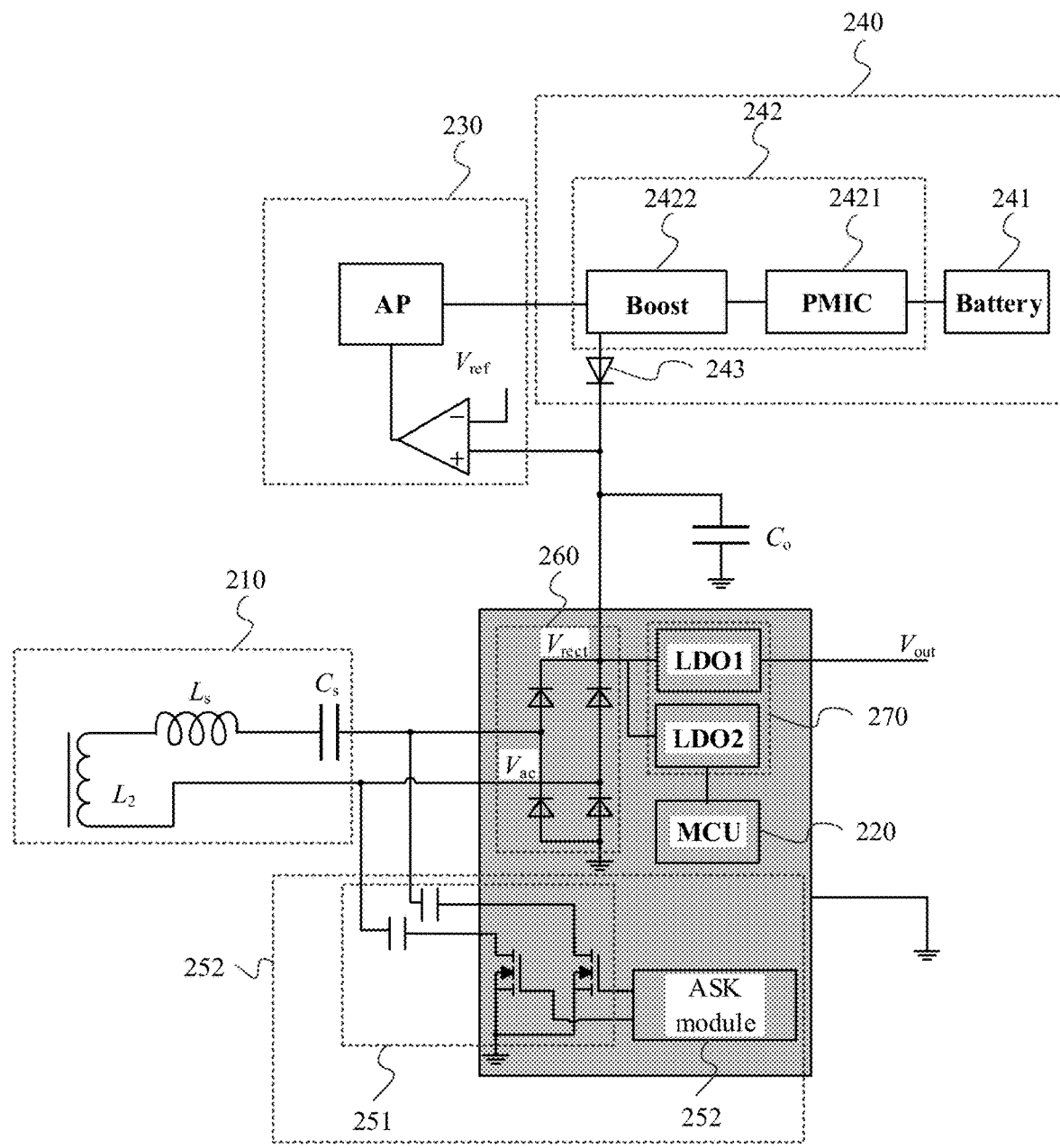
FIG. 13 is a circuit diagram of a receiver according to an embodiment of this application.

In an embodiment, as shown in FIG. 13, the rectifier module 260 is an uncontrolled rectifier module that includes four diodes connected in parallel. The buck module 270 includes two low dropout regulators (LDO) connected in parallel. An LDO1 is responsible for supplying power to the power consumption load, and an LDO2 is responsible for supplying power to the power processor 220.

In an embodiment, the power processor 220 is a microcontroller unit (MCU).

In some embodiments, as shown in FIG. 13, the sampling control module 230 is connected to the oscillation circuit 210 by using the rectifier module 260. To be specific, the output end of the oscillation circuit 210 is connected to an input end of the rectifier module 260, and the sampling control module 230 is connected to an output end of the rectifier module 260, and is configured to collect an output voltage value of the rectifier module 260, that is, both the first voltage value and the second voltage value that are output by the oscillation circuit 210 in the foregoing embodiments are voltage values that are rectified and regulated by the rectifier module 260. A implementation process is as follows: In the ping phase, the sampling control module 230 collects the first voltage value output by the rectifier module 260, and when the first voltage value is less than the startup voltage value of the power processor 220, controls the auxiliary power supply module 240 to supply power to the power processor 220, so that the power processor 220 is started. After being started, the power processor 220 sends the power transfer instruction to the transmitter, so that the transmitter sends the second energy based on the power transfer instruction. In the power transfer phase, the sampling control module 230 collects the second voltage value output by the rectifier module 260, and when the second voltage value is greater than the output voltage of the auxiliary power supply module 240, controls the auxiliary power supply module 240 to be disabled. For a process thereof, refer to the descriptions in the embodiment in FIG. 4. Details are not described herein again.

Figure 14:
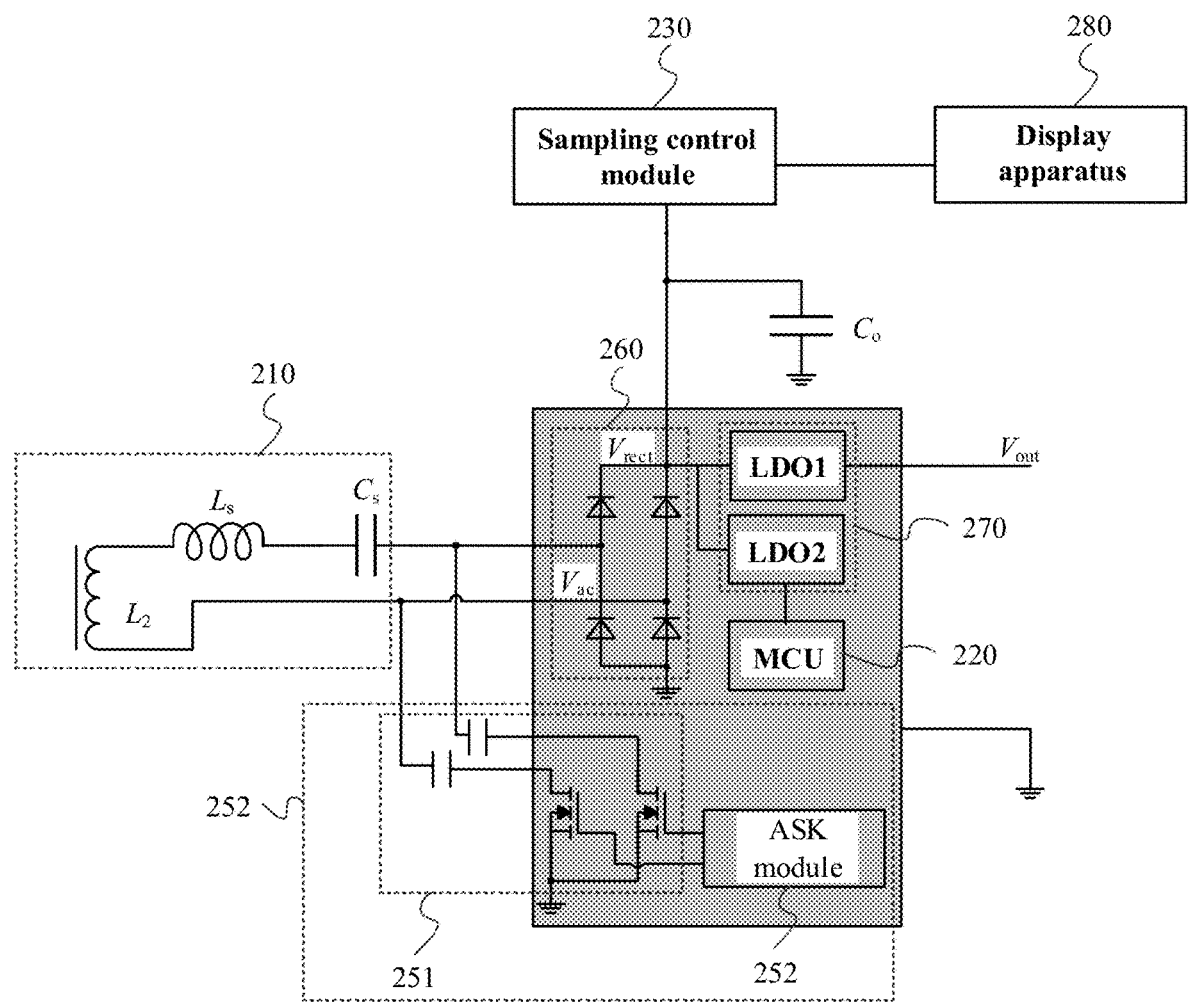
FIG. 14 is a circuit diagram of a receiver according to an embodiment of this application.

FIG. 14 is a circuit diagram of a receiver according to an embodiment of this application. The receiver 20 includes a display apparatus 280. The display apparatus 180 is connected to the sampling control module 230. A implementation process is as follows: In the ping phase, the sampling control module 230 collects the first voltage value output by the rectifier module 260, and compares the first voltage value with the startup voltage value of the power processor 220. When the first voltage value is less than the startup voltage value of the power processor 220, the sampling control module 230 sends prompt information to the display apparatus 280. For example, the prompt information is "a receiving terminal device is deviated, and needs to move to a center of a transmit end". After obtaining the prompt information by using the display apparatus 280, a user adjusts a position between the receiver 20 and the transmitter, so that the receiver 20 is connected to the transmitter in the ping phase to perform subsequent power transfer. In this way, the degree of freedom of the wireless charging system can be indirectly increased.

Figure 15:
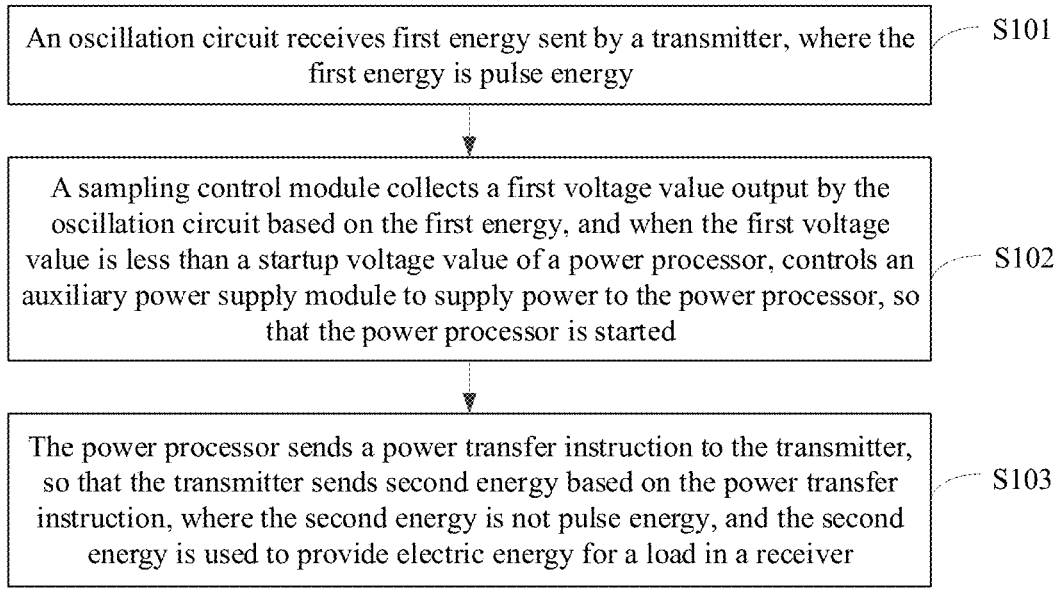
FIG. 15 is a flowchart of a wireless charging method according to an embodiment of this application.

FIG. 15 is a flowchart of a wireless charging method according to an embodiment of this application. The wireless charging method is applied to the receiver shown in FIG. 4. As shown in FIG. 4, the receiver includes an oscillation circuit, a power processor, a sampling control module, and an auxiliary power supply module. The charging method includes the following operations:

S101. The oscillation circuit receives first energy sent by a transmitter, where the first energy is pulse energy.

S102. The sampling control module collects a first voltage value output by the oscillation circuit based on the first energy, and when the first voltage value is less than a startup voltage value of the power processor, controls the auxiliary power supply module to supply power to the power processor, so that the power processor is started.

S103. The power processor sends a power transfer instruction to the transmitter, so that the transmitter sends second energy based on the power transfer instruction, where the second energy is not pulse energy, and the second energy is used to provide electric energy for a load in the receiver.

In the wireless charging method in an embodiment of the application, referring to FIG. 4, in the ping phase, the oscillation circuit 210 is configured to receive the first energy sent by the transmitter, and the sampling control module 230 collects the first voltage value output by the oscillation circuit 210 based on the first energy, and when the first voltage value is less than the startup voltage value of the power processor 220, controls the auxiliary power supply module 240 to supply power to the power processor 220, so that the power processor 220 is started. Then, the power transfer phase is entered, and the power processor 220 sends the power transfer instruction to the transmitter, so that the transmitter sends the second energy based on the power transfer instruction, to provide electric energy for the load in the receiver 20. According to the receiver 20, the sampling control module 230 and the auxiliary power supply module 240 are disposed. Therefore, when the receiver 20 is outside the original degree of freedom range of the transmitter, the sampling control module 230 may control the auxiliary power supply module 240 to supply power to the power processor 220, so that the receiver 20 is connected to the transmitter in the ping phase to enter the subsequent power transfer phase. This increases a degree of freedom of a wireless charging system.

For a implementation process in an embodiment of the application, refer to the working process of the receiver shown in FIG. 4. Details are not described herein again.

On the basis of FIG. 15, the wireless charging method in an embodiment of the application further includes an operation of stopping supplying power to the power processor, and the operation of stopping supplying power to the power processor includes two manners.

Figure 16:
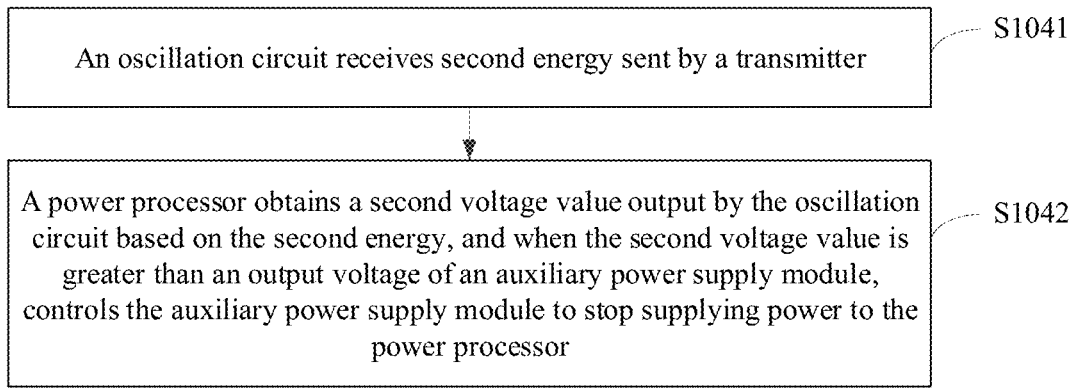
FIG. 16 is a flowchart of another wireless charging method according to an embodiment of this application.

Manner 1: Referring to FIG. 16, the power processor controls the auxiliary power supply module to stop supplying power to the power processor. This includes the following operations:

S1041. The oscillation circuit receives the second energy sent by the transmitter.

S1042. The power processor obtains a second voltage value output by the oscillation circuit based on the second energy, and when the second voltage value is greater than an output voltage of the auxiliary power supply module, controls the auxiliary power supply module to stop supplying power to the power processor.

Figure 17:
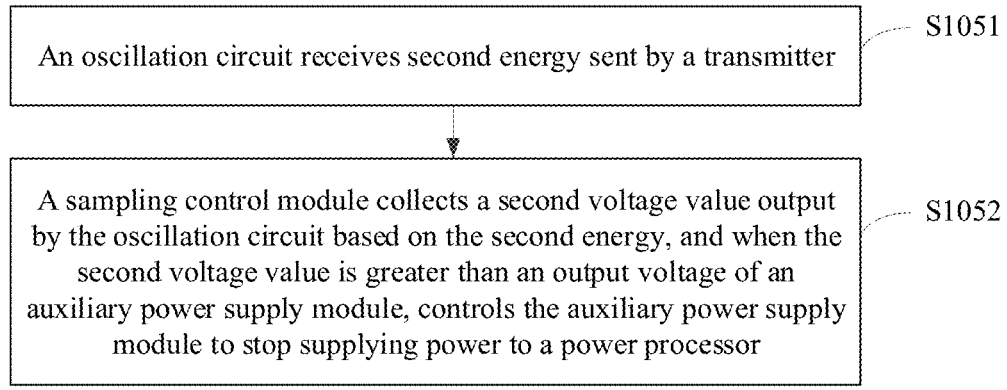
FIG. 17 is a flowchart of still another wireless charging method according to an embodiment of this application.

Manner 2: Referring to FIG. 17, the sampling control module controls the auxiliary power supply module to stop supplying power to the power processor. This includes the following operations:

S1051. The oscillation circuit receives the second energy sent by the transmitter.

S1052. The sampling control module collects a second voltage value output by the oscillation circuit based on the second energy, and when the second voltage value is greater than an output voltage of the auxiliary power supply module, controls the auxiliary power supply module to stop supplying power to the power processor.

For a implementation process in an embodiment of the application, refer to the foregoing working process, of the receiver, of controlling the auxiliary power supply module to stop supplying power to the power processor. Details are not described herein again.

The sampling control module in the foregoing embodiment may include different structures.

In an example, the sampling control module includes an application processor.

In another example, as shown in FIG. 5, the sampling control module includes an application processor and a sampling unit.

In this example, S102 may include the following operations:

Operation A1. The sampling unit collects the first voltage value output by the oscillation circuit, compares the first voltage value with the startup voltage value of the power processor to obtain a first comparison result, and sends the first comparison result to the application processor.

Operation A2. When the first comparison result is that the first voltage value is less than the startup voltage value of the power processor, the application processor controls the auxiliary power supply module to supply power to the power processor.

In this example, S1052 may include the following operations:

Operation B1. The sampling unit collects the second voltage value output by the oscillation circuit, compares the second voltage value with the output voltage value of the auxiliary power supply module to obtain a second comparison result, and sends the second comparison result to the application processor.

Operation B2. When the second comparison result is that the second voltage value is greater than the output voltage of the auxiliary power supply module, the application processor controls the auxiliary power supply module to be disabled.

For example, the sampling unit includes a comparator and a first reference voltage providing circuit.

The first reference voltage providing circuit is configured to provide the output voltage value of the auxiliary power supply module and the startup voltage value of the power processor.

The comparator is configured to: collect an output voltage of the oscillation circuit, obtain the output voltage value of the auxiliary power supply module or the startup voltage value of the power processor that is output by the reference voltage providing circuit, and output the first comparison result or the second comparison result to the application processor.

For a implementation process of the wireless charging method provided in an embodiment of the application, refer to the descriptions shown in FIG. 5 and FIG. 6. Details are not described herein again.

On the basis of the foregoing embodiment, in an embodiment, referring to FIG. 7, the auxiliary power supply module in an embodiment of the application includes a battery and a power supply control unit.

The power supply control unit is configured to output electric energy of the battery to the power processor under control of the sampling control module.

In an embodiment, the auxiliary power supply module further includes a backflow preventive unit. The backflow preventive unit is configured to: when the output voltage value of the oscillation circuit is greater than an output voltage value of the power supply control unit, prohibit electric energy output by the oscillation circuit from flowing back to the power supply control unit.

In an embodiment, the backflow preventive unit includes a diode or a MOS transistor.

In an embodiment, referring to FIG. 8, the power supply control unit includes a power management integrated circuit and a direct current converter.

The sampling control module is configured to enable the direct current converter.

The power management integrated circuit is configured to output the electric energy of the battery to the power processor by using the enabled direct current converter.

In an embodiment, referring to FIG. 9, the power supply control unit includes a power management integrated circuit, a direct current converter, and a switch unit.

The switch unit is configured to be closed and opened under control of the sampling control module.

The power management integrated circuit is configured to: when the switch unit is closed, output the electric energy of the battery to the power processor by using the direct current converter.

In an embodiment, the switch unit is a metal-oxide semiconductor field-effect (MOS) transistor.

In an embodiment, the direct current converter is a direct current converter in the power management integrated circuit.

For a implementation process of the wireless charging method provided in an embodiment of the application, refer to the descriptions shown in FIG. 7 to FIG. 9. Details are not described herein again.

Figure 10:
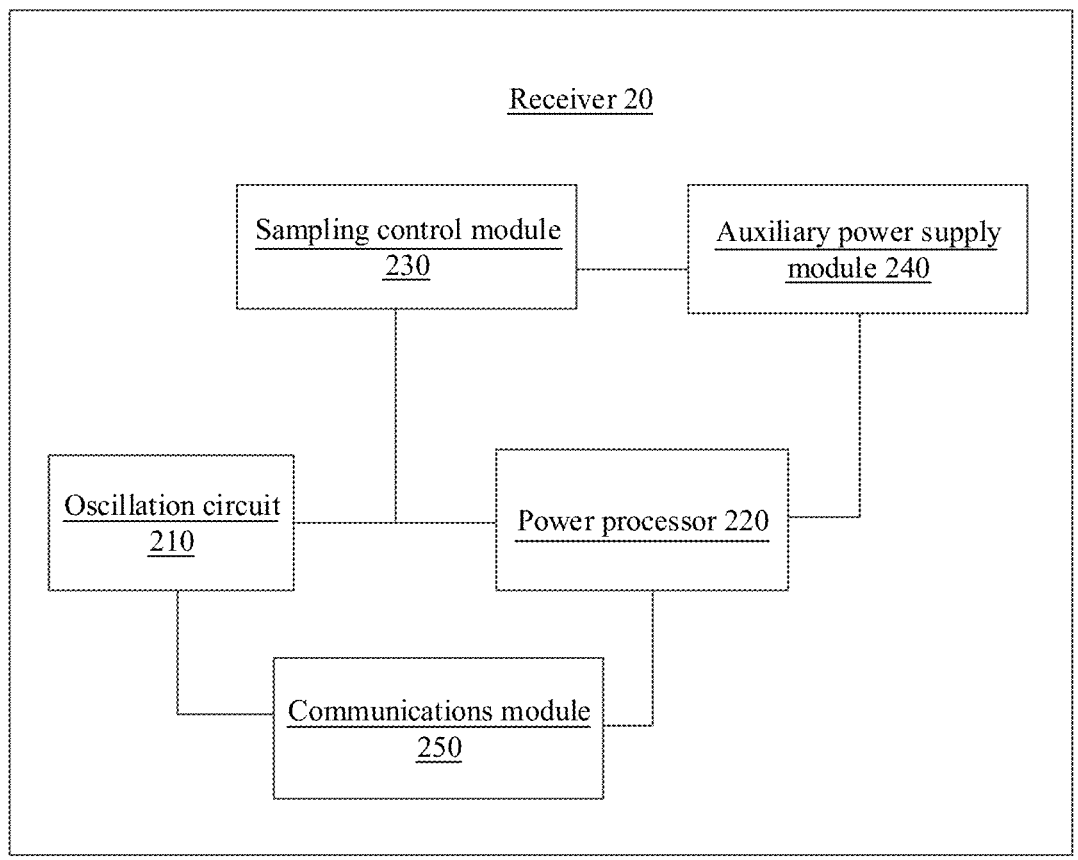
FIG. 10 is a schematic diagram of a structure of a receiver according to an embodiment of this application.

On the basis of the foregoing embodiment, referring to FIG. 10, the receiver in an embodiment of the application further includes a communications module. In this case, that the power processor sends a power transfer instruction to the transmitter in S103 includes the following operation:

S1031. The power processor sends the power transfer instruction to the transmitter by using the communications module.

In an embodiment, referring to FIG. 11, the communications module includes a communications modulation module. In this case, S1031 may include the following operation:

S10311. The power processor generates the power transfer instruction by adjusting the communications modulation module, and sends the power transfer instruction to the transmitter by using the communications module.

In an example, the communications modulation module includes at least one capacitor or at least one resistor. In this case, that the power processor generates the power transfer instruction by adjusting the communications modulation module in S10311 includes the following operation:

S10311a. The power processor generates the power transfer instruction by adjusting a voltage value of the at least one capacitor or the at least one resistor, and sends the power transfer instruction to the transmitter by using the communications module.

In an embodiment, the communications modulation module includes a first communications modulation module and a second communications modulation module. In this case, that the power processor generates the power transfer instruction by adjusting the communications modulation module in S10311 includes the following operations:

Operation C1. When the auxiliary power supply module is enabled, the power processor generates a first power transfer instruction by using the first communications modulation module.

Operation C2. When the auxiliary power supply module is disabled, the power processor generates a second power transfer instruction by using the second communications modulation module.

In an embodiment, the communications modulation module includes a third communications modulation module with an adjustable parameter. That the power processor generates the power transfer instruction by adjusting the communications modulation module in S10311 includes the following operations:

Operation D1. When the auxiliary power supply module is enabled, the power processor generates a first power transfer instruction by adjusting the parameter of the third communications modulation module.

Operation D2. When the auxiliary power supply module is disabled, the power processor generates a second power transfer instruction by adjusting the parameter of the third communications modulation module.

For a implementation process of the wireless charging method provided in an embodiment of the application, refer to the descriptions in the embodiments shown in FIG. 10 to FIG. 12. Details are not described herein again.

Figure 18:
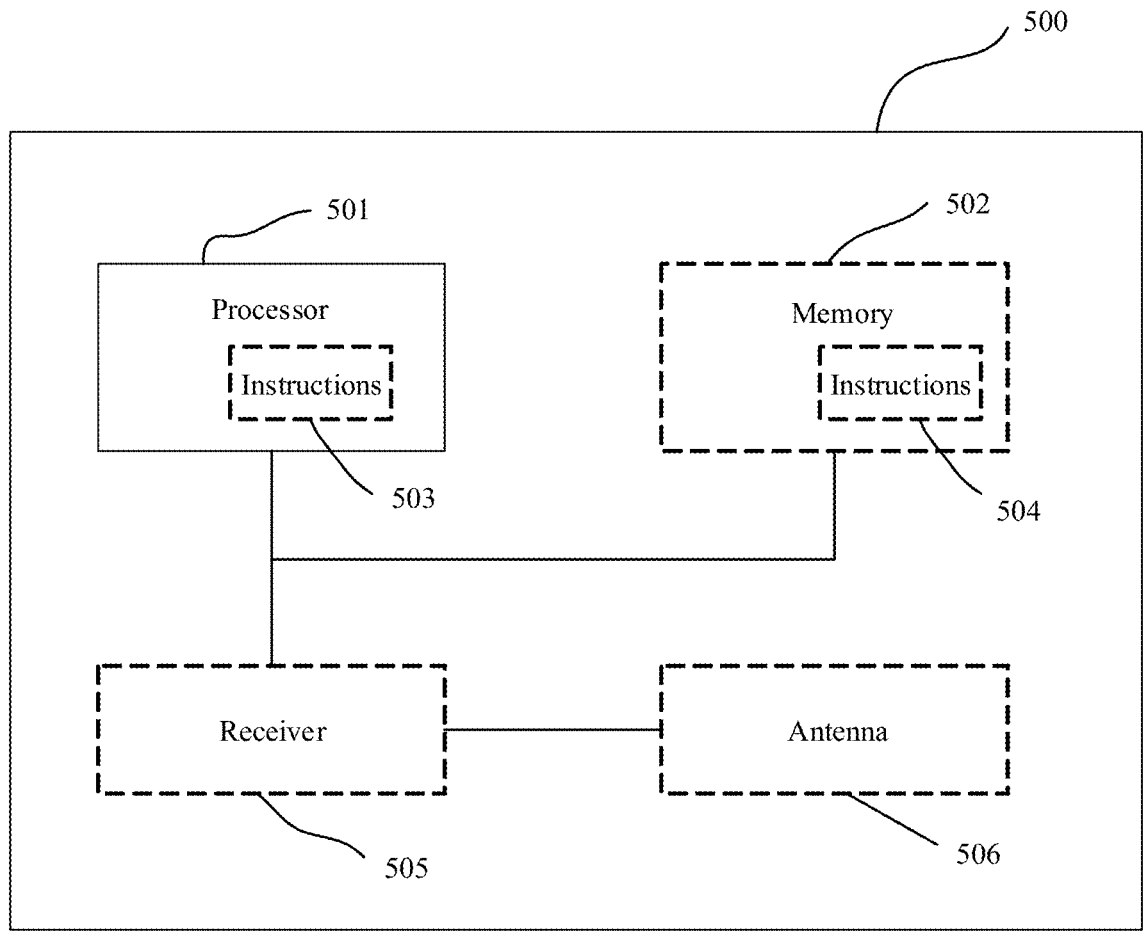
FIG. 18 is a schematic diagram of a structure of a terminal device according to an embodiment of this application.

FIG. 18 is a schematic diagram of a structure of a terminal device according to an embodiment of this application. As shown in FIG. 18, a terminal device 500 in an embodiment includes a receiver 505 shown in the foregoing embodiment, and the receiver 505 may be the receiver in any one of FIG. 4 to FIG. 14. The receiver 505 may be configured to implement the foregoing wireless charging method embodiment. For details, refer to the descriptions in the foregoing method embodiment.

The terminal device 500 may include one or more processors 501. The processor 501 may also be referred to as a processing unit, and may implement a specified control or processing function. The processor 501 may be a general-purpose processor, a dedicated processor, or the like, for example, may be a baseband processor or a central processing unit. The baseband processor may be configured to process a communication protocol and communication data. The central processing unit may be configured to: control a communications device, execute a software program, and process data of the software program.

In an embodiment, the processor 501 may also store instructions 503 or data (for example, intermediate data). The instructions 503 may be run by the processor, so that the terminal device 500 performs the foregoing wireless charging method embodiment.

In an embodiment, the terminal device 500 may include a circuit. The circuit may implement a sending, receiving, or communication function in the foregoing method embodiment.

In an embodiment, the terminal device 500 may include one or more memories 502 that may store instructions 504. The instructions may be run on the processor, so that the terminal device 500 performs the method described in the foregoing method embodiment.

In an embodiment, the processor 501 and the memory 502 may be separately disposed, or may be integrated together.

In an embodiment, the terminal device 500 may further include a transmitter and/or an antenna 506. The processor 501 may be referred to as a processing unit, and controls the terminal device 500. The receiver 505 may be referred to as a transceiver unit, a transceiver, a transceiver circuit, a transceiver, or the like, and is configured to implement a sending/receiving function of the terminal device.

For implementation processes of the receiver 505 and the processor 501, refer to the related descriptions in the foregoing embodiments. Details are not described herein again.

The processor 501 and the receiver 505 described in this application may be implemented on an integrated circuit (IC), an analog IC, a radio frequency integrated circuit (RFIC), a mixed signal IC, an application-specific integrated circuit (ASIC), a printed circuit board (PCB), an electronic device, or the like. The processor 501 and the receiver 505 may also be manufactured by using various IC process technologies, for example, a complementary metal-oxide-semiconductor (CMOS), an N-channel metal-oxide-semiconductor (NMOS), a P-channel metal-oxide-semiconductor (PMOS), a bipolar junction transistor (BJT), a bipolar CMOS (BiCMOS), silicon germanium (SiGe), and gallium arsenide (GaAs).

In the descriptions in the foregoing embodiment, a structure of the terminal device 500 may not be limited by FIG. 18.

The terminal device in an embodiment of the application may be used to execute the foregoing wireless charging technical solutions. The implementation principles and technical effects are similar, and are not further described herein.

Figure 19:
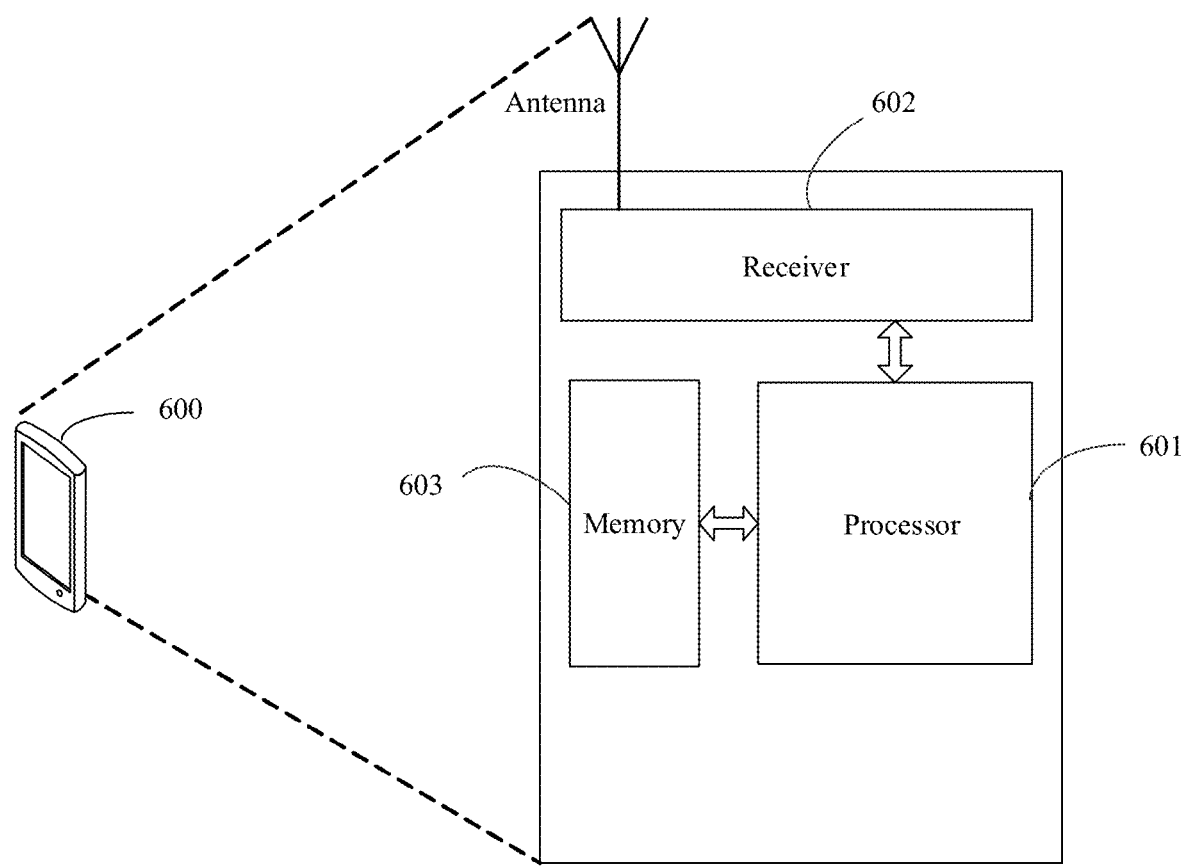
FIG. 19 is a schematic diagram of a structure of a terminal device according to an embodiment of this application.

FIG. 19 is a schematic diagram of a structure of a terminal device according to an embodiment of this application. A terminal device 600 includes a receiver 602, the receiver 602 may perform the foregoing wireless charging method, and the receiver 602 may be the receiver in any one of FIG. 4 to FIG. 14.

In an embodiment, a structure of the terminal device 600 includes a processor 601 and a memory 603. The processor 601 is configured to support the terminal device 600 in performing a corresponding function in the foregoing method. The receiver 602 is configured to support communication between the terminal device 600 and another terminal device or a network device. The terminal device 600 may further include the memory 603. The memory 603 is configured to be coupled to the processor 601, and stores program instructions and data that are necessary for the terminal device 600.

After the terminal device 600 is powered on, the processor 601 may read the program instructions and the data in the memory 603, interpret and execute the program instructions, and process data of the program instructions. During data sending, the processor 601 performs baseband processing on to-be-sent data, and then outputs a baseband signal to the receiver 602. After performing radio frequency processing on the baseband signal, the receiver 602 sends a radio frequency signal in an electromagnetic wave form by using an antenna. When data is sent to the terminal device, the receiver 602 receives a radio frequency signal by using the antenna, converts the radio frequency signal into a baseband signal, and outputs the baseband signal to the processor 601. The processor 601 converts the baseband signal into data, and processes the data.

One of ordinary skilled in the art may understand that for ease of description, FIG. 19 shows only one memory 603 and only one processor 601. An actual terminal device 600 may have a plurality of processors 601 and a plurality of memories 603. The memory 603 may also be referred to as a storage medium, a storage device, or the like. This is not limited in an embodiment of the application.

The terminal device in an embodiment of the application may be used to execute the foregoing wireless charging technical solutions. The implementation principles and technical effects are similar, and are not further described herein.

Figure 20:
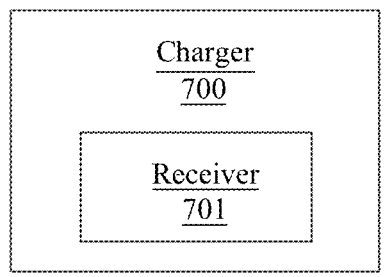
FIG. 20 is a schematic diagram of a structure of a charger according to an embodiment of this application.

FIG. 20 is a schematic diagram of a structure of a charger according to an embodiment of this application. As shown in FIG. 20, a charger 700 in an embodiment of the application includes a receiver 701 in any one of FIG. 4 to FIG. 14, and the receiver 701 may perform the foregoing wireless charging method.

The charger in an embodiment of the application may be used to execute the foregoing wireless charging technical solutions. The implementation principles and technical effects are similar, and are not further described herein.

It may be understood that when an embodiment of the application is applied to a receiver chip, the receiver chip implements a function of the receiver in the foregoing wireless charging method embodiment. The receiver chip sends information to another module (such as a radio frequency module or an antenna) in the receiver, and the information is sent to the receiver by using the another module in the receiver. Alternatively, the receiver chip may receive information from another module (such as a radio frequency module or an antenna) in the receiver, and the information is sent by the receiver to a transmitter.

It may be understood that in this application, technical terms and technical solutions in different embodiments may be mutually referenced and mutually cited based on internal logic thereof, and embodiments to which the technical terms and the technical solutions are applicable are not limited in this application. The technical solutions in different embodiments are mutually combined to form a new embodiment.

It may be understood that the processor in the embodiments of this application may be a central processing unit (CPU), may be another general-purpose processor, a digital signal processor (DSP), an application specific integrated circuit (ASIC), a field programmable gate array (FPGA), or another programmable logic device, a transistor logic device, a hardware component, or any combination thereof. The general-purpose processor may be a microprocessor or any regular processor.

The method operations in the embodiments of this application may be implemented by hardware, or may be implemented by a processor executing a software instruction. The software instruction may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the receiver. Certainly, the processor and the storage medium may exist in the receiving apparatus as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

One of ordinary skill in the art may understand that all or some of the processes of the methods in the embodiments may be implemented by a computer program instructing related hardware. The program may be stored in a computer-readable storage medium. When the program runs, the processes of the methods in the embodiments are performed. The foregoing storage medium includes: any medium that can store program code, such as a ROM or a random access memory RAM, a magnetic disk or an optical disc, and the like.

It may be clearly understood by one of ordinary skilled in the art that, for the purpose of convenient and brief description, for a detailed working process of the foregoing system, apparatus, and unit, refer to a corresponding process in the foregoing method embodiments, and details are not described herein again. In addition, the method embodiments and the apparatus embodiments may also be mutually referenced. Same or corresponding content in different embodiments may be mutually cited, and details are not described again.

What is claimed is:

1. A receiver, comprising:
   an auxiliary power supply module;
   an oscillation circuit to receive first energy sent by a transmitter, wherein the first energy is pulse energy in a ping phase;
   a sampling control module configured to:
      collect a first voltage value output by the oscillation circuit based on the first energy in the ping phase, and
      when the first voltage value is less than a startup voltage value of a power processor, control the auxiliary power supply module to supply power to the power processor, so that the power processor is started; and
   the power processor configured to send a power transfer instruction to the transmitter, the power transfer instruction instructing the transmitter to send second energy based on the power transfer instruction, wherein the second energy is not pulse energy, and wherein the second energy is used to provide electric energy for a load in the receiver.

2. The receiver according to claim 1, wherein
the oscillation circuit is further configured to receive the second energy sent by the transmitter; and
the sampling control module is further configured to:
   collect a second voltage value output by the oscillation circuit based on the second energy, and
   when the second voltage value is greater than an output voltage of the auxiliary power supply module, control the auxiliary power supply module to stop supplying power to the power processor.

3. The receiver according to claim 1, wherein
the oscillation circuit is further configured to receive the second energy sent by the transmitter; and
the power processor is further configured to:
   obtain a second voltage value output by the oscillation circuit based on the second energy, and
   when the second voltage value is greater than an output voltage of the auxiliary power supply module, control the auxiliary power supply module to stop supplying power to the power processor.

4. The receiver according to claim 1, wherein the sampling control module comprises an application processor, and wherein the application processor is separately connected to the oscillation circuit and the auxiliary power supply module.

5. The receiver according to claim 1, wherein the sampling control module comprises:
   an application processor connected to the auxiliary power supply module; and
   a sampling unit separately connected to the oscillation circuit and the application processor, wherein the sampling unit is configured to:
   collect the first voltage value output by the oscillation circuit, compare the first voltage value with the startup voltage value of the power processor to obtain a first comparison result, and
   send the first comparison result to the application processor; and
   wherein the application processor is configured to: when the first comparison result is that the first voltage value is less than the startup voltage value of the power processor, control the auxiliary power supply module to supply power to the power processor.

6. The receiver according to claim 5, wherein
the sampling unit is further configured to:
   collect the second voltage value output by the oscillation circuit, compare the second voltage value with the output voltage value of the auxiliary power supply module to obtain a second comparison result, and
   send the second comparison result to the application processor; and
   wherein the application processor is further configured to:
   when the second comparison result is that the second voltage value is greater than the output voltage of the auxiliary power supply module, control the auxiliary power supply module to stop supplying power to the power processor.

7. The receiver according to claim 5, wherein the sampling unit comprises a comparator and a reference voltage providing circuit, and wherein the reference voltage providing circuit is configured to provide the output voltage value of the auxiliary power supply module and the startup voltage value of the power processor,
   wherein a first input end of the comparator is connected to an output end of the oscillation circuit to collect an output voltage of the oscillation circuit,
   wherein a second input end of the comparator is connected to the reference voltage providing circuit to obtain the output voltage value of the auxiliary power supply module or the startup voltage value of the power processor that is output by the reference voltage providing circuit, and wherein an output end of the comparator is connected to the application processor to output the first comparison result or the second comparison result to the application processor.

8. The receiver according to claim 1, wherein the receiver further comprises a communications module, and
wherein the power processor is configured to send the power transfer instruction to the transmitter by using the communications module.

9. The receiver according to claim 8, wherein the communications module comprises a communications modulation module, and
wherein the power processor is configured to:
generate the power transfer instruction by adjusting the communications modulation module, and
send the power transfer instruction to the transmitter by using the communications module.

10. A receiver, comprising:
an auxiliary power supply module;
an oscillation circuit to receive first energy sent by a transmitter, wherein the first energy is pulse energy;
a sampling control module configured to:
collect a first voltage value output by the oscillation circuit based on the first energy, and
when the first voltage value is less than a startup voltage value of a power processor, control the auxiliary power supply module to supply power to the power processor, so that the power processor is started; and
a power processor to send a power transfer instruction to the transmitter to instruct the transmitter to send second energy based on the power transfer instruction, wherein the second energy is not pulse energy, and wherein the second energy is used to provide electric energy for a load in the receiver;
wherein the auxiliary power supply module comprises a battery and a power supply control unit,
wherein a first end of the power supply control unit is connected to an output end of the battery, a second end of the power supply control unit is connected to the sampling control module, and a third end of the power supply control unit is connected to the power processor; and
wherein the power supply control unit is configured to output electric energy of the battery to the power processor under control of the sampling control module.

11. The receiver according to claim 10, wherein the auxiliary power supply module further comprises a backflow preventive unit connected between the third end of the power supply control unit and the power processor; and wherein
the backflow preventive unit is configured to:
when the output voltage value of the oscillation circuit is greater than an output voltage value of the power supply control unit, prohibit electric energy output by the oscillation circuit from flowing back to the power supply control unit.

12. The receiver according to claim 10, wherein the power supply control unit comprises a power management integrated circuit and a direct current converter,
wherein an input end of the power management integrated circuit is connected to the output end of the battery, an output end of the power management integrated circuit is connected to a first end of the direct current converter, a second end of the direct current converter is connected to an output end of the sampling control module, and a third end of the direct current converter is connected to the power processor,
wherein the sampling control module is configured to enable the direct current converter; and
wherein the power management integrated circuit is configured to output the electric energy of the battery to the power processor by using the enabled direct current converter.

13. The receiver according to claim 10, wherein the power supply control unit comprises a power management integrated circuit, a direct current converter, and a switch unit,
wherein an input end of the power management integrated circuit is connected to the output end of the battery, an output end of the power management integrated circuit is connected to an input end of the direct current converter, an output end of the direct current converter is connected to a first end of the switch unit, a second end of the switch unit is connected to an output end of the sampling control module, and a third end of the switch unit is connected to the power processor,
wherein the sampling control module is configured to control closing and opening of the switch unit; and
wherein the power management integrated circuit is configured to:
when the switch unit is closed, output the electric energy of the battery to the power processor by using the direct current converter.

14. A wireless charging method, applied to a receiver, wherein the receiver comprises an oscillation circuit, a power processor, a sampling control module, and an auxiliary power supply module, and the method comprises:
receiving, by the oscillation circuit, first energy sent by a transmitter, wherein the first energy is pulse energy in a ping phase;
collecting, by the sampling control module, a first voltage value output by the oscillation circuit based on the first energy in the ping phase;
when the first voltage value is less than a startup voltage value of the power processor, controlling the auxiliary power supply module to supply power to the power processor, so that the power processor is started; and
sending, by the power processor, a power transfer instruction to the transmitter to instruct the transmitter to second energy based on the power transfer instruction, wherein the second energy is not pulse energy, and wherein the second energy is used to provide electric energy for a load in the receiver.

15. The method according to claim 14 further comprising:
receiving, by the oscillation circuit, the second energy sent by the transmitter; and
collecting, by the sampling control module, a second voltage value output by the oscillation circuit based on the second energy, and when the second voltage value is greater than an output voltage of the auxiliary power supply module, controlling the auxiliary power supply module to stop supplying power to the power processor.

16. The method according to claim 14, further comprising:
receiving, by the oscillation circuit, the second energy sent by the transmitter; and
obtaining, by the power processor, a second voltage value output by the oscillation circuit based on the second energy, and when the second voltage value is greater than an output voltage of the auxiliary power supply module, controlling the auxiliary power supply module to stop supplying power to the power processor.

17. The method according to claim 14, wherein the sampling control module comprises an application processor and a sampling unit, and
wherein the collecting the first voltage value output by the oscillation circuit based on the first energy, and when the first voltage value is less than a startup voltage value of the power processor, controlling the auxiliary power supply module to supply power to the power processor comprises:
collecting, by the sampling unit, the first voltage value output by the oscillation circuit, comparing the first voltage value with the startup voltage value of the power processor to obtain a first comparison result, and sending the first comparison result to the application processor; and
when the first comparison result is that the first voltage value is less than the startup voltage value of the power processor, controlling, by the application processor, the auxiliary power supply module to supply power to the power processor.

18. The method according to claim 17, wherein the collecting a second voltage value output by the oscillation circuit based on the second energy, and when the second voltage value is greater than an output voltage of the auxiliary power supply module, controlling the auxiliary power supply module to be disabled comprises:
collecting, by the sampling unit, the second voltage value output by the oscillation circuit, comparing the second voltage value with the output voltage value of the auxiliary power supply module to obtain a second comparison result, and sending the second comparison result to the application processor; and
when the second comparison result is that the second voltage value is greater than the output voltage of the auxiliary power supply module, controlling, by the application processor, the auxiliary power supply module to be disabled.

19. A terminal device, comprising a receiver, the receiver comprising:
an auxiliary power supply module,
an oscillation circuit is configured to receive first energy sent by a transmitter, wherein the first energy is pulse energy;
a sampling control module is configured to:
collect a first voltage value output by the oscillation circuit based on the first energy, and
when the first voltage value is less than a startup voltage value of a power processor, control the auxiliary power supply module to supply power to the power processor, so that the power processor is started; and
the power processor is configured to send a power transfer instruction to the transmitter, so that the transmitter sends second energy based on the power transfer instruction, wherein the second energy is not pulse energy, and the second energy is used to provide electric energy for a load in the receiver.

* * * * *